United States Patent
Kawai

(10) Patent No.: US 9,429,749 B2
(45) Date of Patent: Aug. 30, 2016

(54) VIBRATION APPARATUS AND IMAGING APPLIANCE

(71) Applicant: Olympus Corporation, Tokyo (JP)

(72) Inventor: Sumio Kawai, Hachioji (JP)

(73) Assignee: OLYMPUS CORPORATION (JP)

(*) Notice: Subject to any disclaimer, the term of this patent is extended or adjusted under 35 U.S.C. 154(b) by 114 days.

(21) Appl. No.: 14/140,986

(22) Filed: Dec. 26, 2013

(65) Prior Publication Data
US 2014/0185140 A1    Jul. 3, 2014

(30) Foreign Application Priority Data

Dec. 27, 2012  (JP) ................................ 2012-285908

(51) Int. Cl.
*G02B 27/00*  (2006.01)
*H02N 2/00*   (2006.01)
*H04N 5/217*  (2011.01)

(52) U.S. Cl.
CPC .......... *G02B 27/0006* (2013.01); *H02N 2/001* (2013.01); *H04N 5/2171* (2013.01)

(58) Field of Classification Search
CPC .... G02B 27/0006; G02B 23/16; G02B 1/16; H01L 41/00; H02N 2/001; H04N 5/2171; B08B 7/02
USPC .................. 359/507, 511, 513; 310/311, 314
See application file for complete search history.

(56) References Cited

U.S. PATENT DOCUMENTS

| | | | | |
|---|---|---|---|---|
| 6,208,065 | B1* | 3/2001 | Ueyama | 310/328 |
| 8,828,524 | B2* | 9/2014 | Sakashita | B32B 9/00 428/195.1 |
| 2007/0153385 | A1* | 7/2007 | Sakai | G02B 27/0006 359/511 |
| 2011/0120494 | A1* | 5/2011 | Ifuku et al. | 134/1 |
| 2012/0050609 | A1* | 3/2012 | Ji et al. | 348/374 |

FOREIGN PATENT DOCUMENTS

| | | |
|---|---|---|
| JP | 2004-64555 | 2/2004 |
| JP | 2011-234055 | 11/2011 |
| JP | 2012-153023 | 8/2012 |
| WO | WO 2012137897 A1 * | 10/2012 |

OTHER PUBLICATIONS

WO2012137897A1 (English Translation), Ando, Displacement Sensor, Displacement Detecting Apparatus, and Operation Device, Nov. 10, 2012, WIPO/Patentscope.*

* cited by examiner

*Primary Examiner* — Thomas K Pham
*Assistant Examiner* — Alberto Betancourt
(74) *Attorney, Agent, or Firm* — Volpe and Koenig, P.C.

(57) ABSTRACT

A vibration apparatus includes a plate-shaped dust prevention member, a vibration application member, and an electrode. The vibration application member includes a flexible thin plate-shaped piezoelectric member, and vibrates the dust prevention member. The electrode formed of a conductive thin plate or film, disposed to part or entire holding the piezoelectric member, and partly extends outward relative to the dust prevention member.

17 Claims, 22 Drawing Sheets

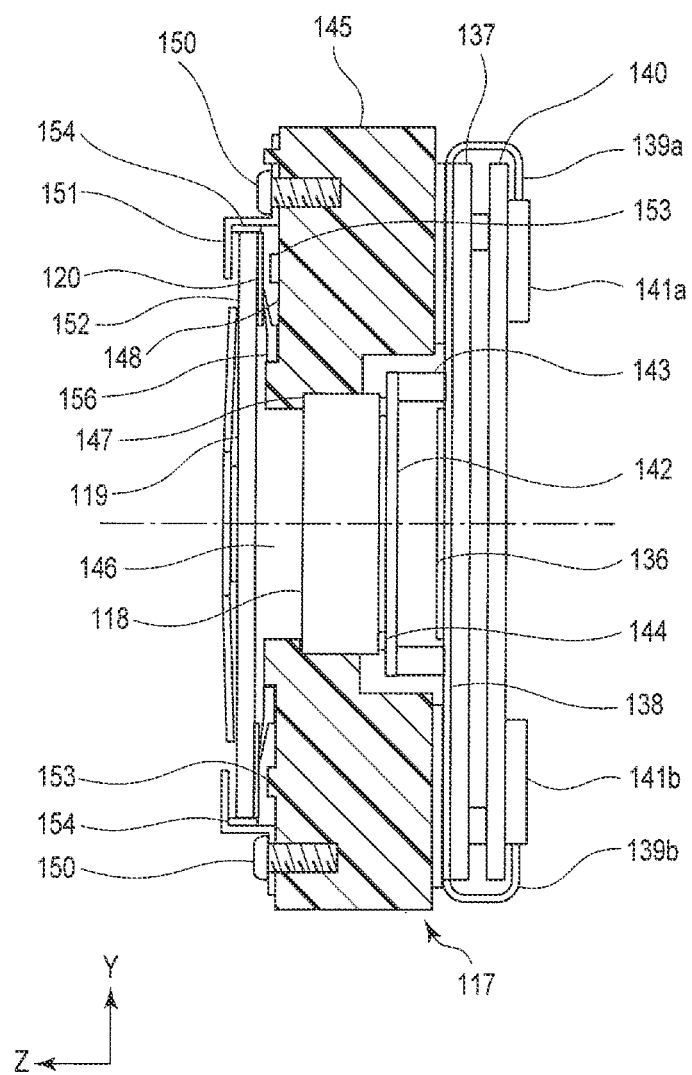
F I G. 2

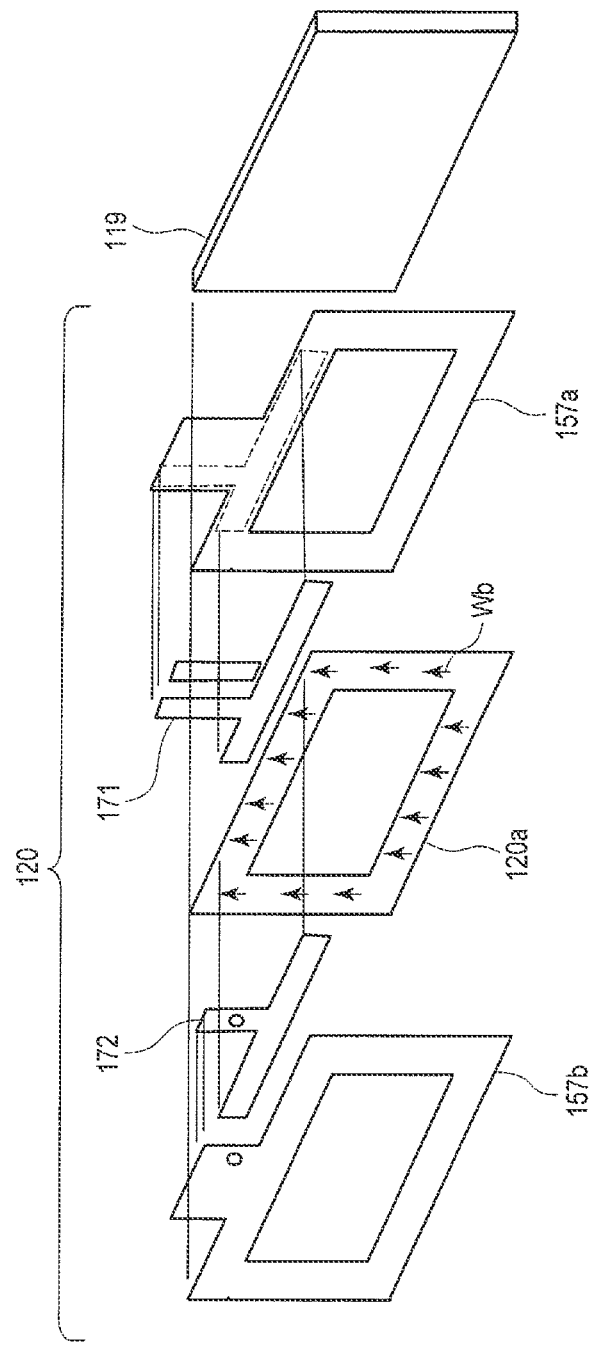
F I G. 4

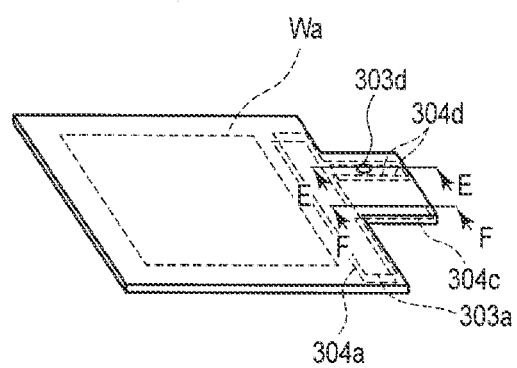
F I G. 11

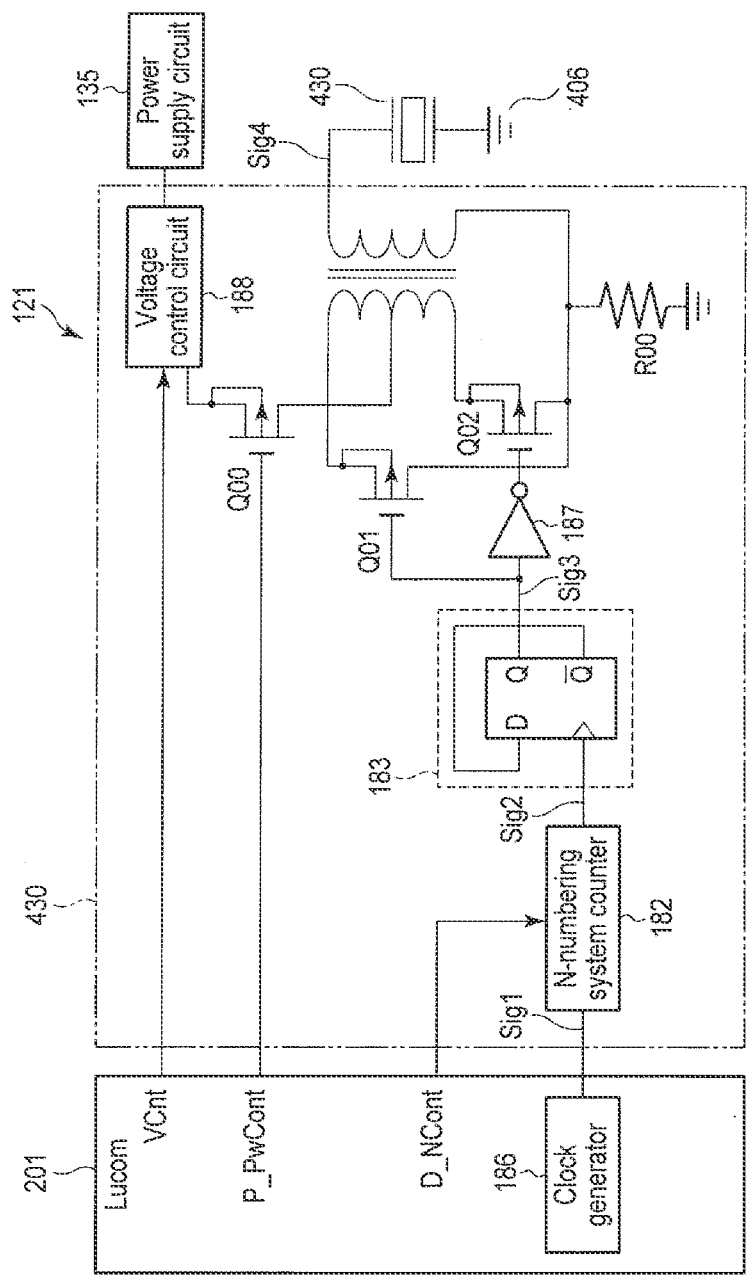
F I G. 15

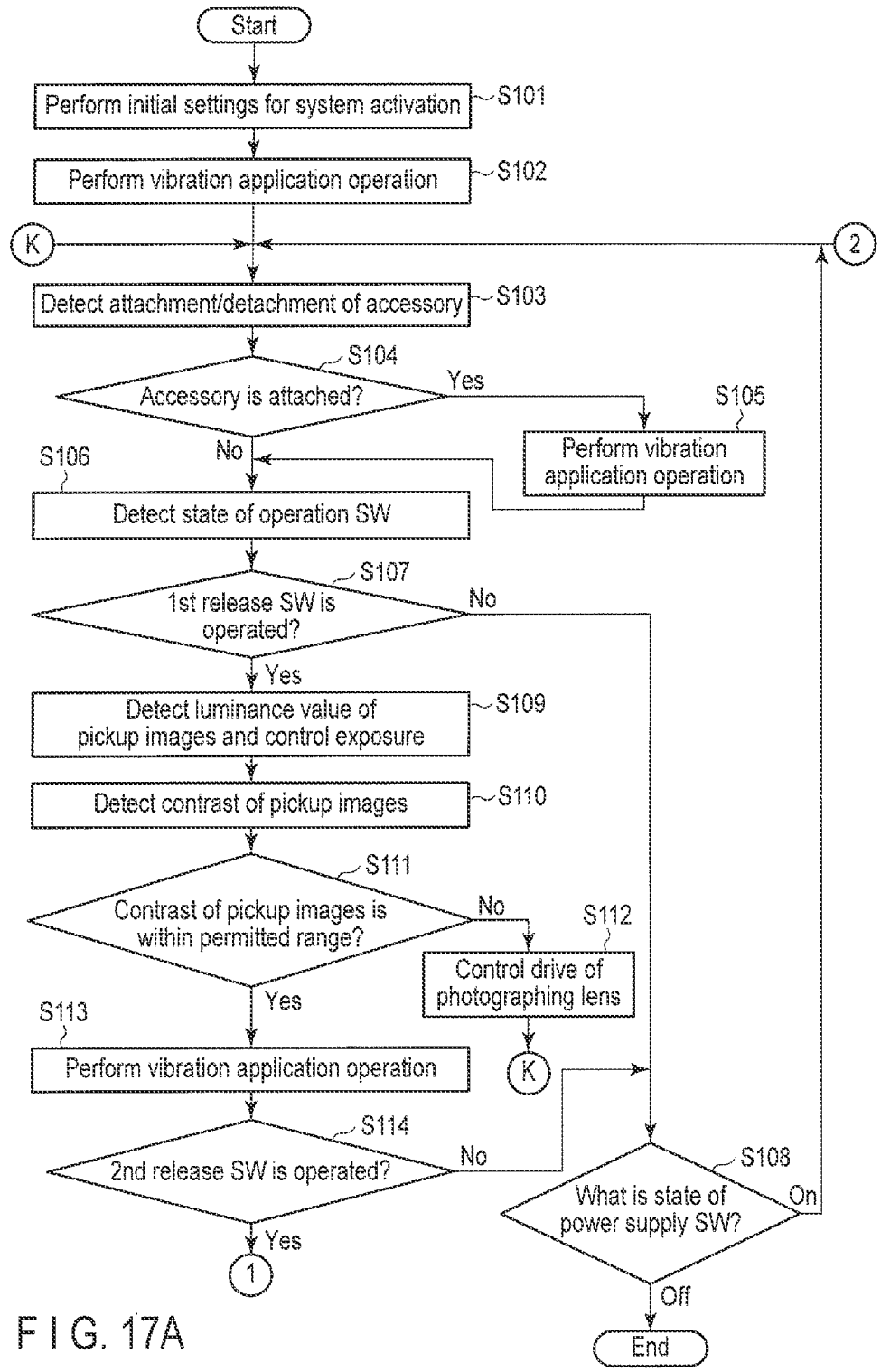
F I G. 17A

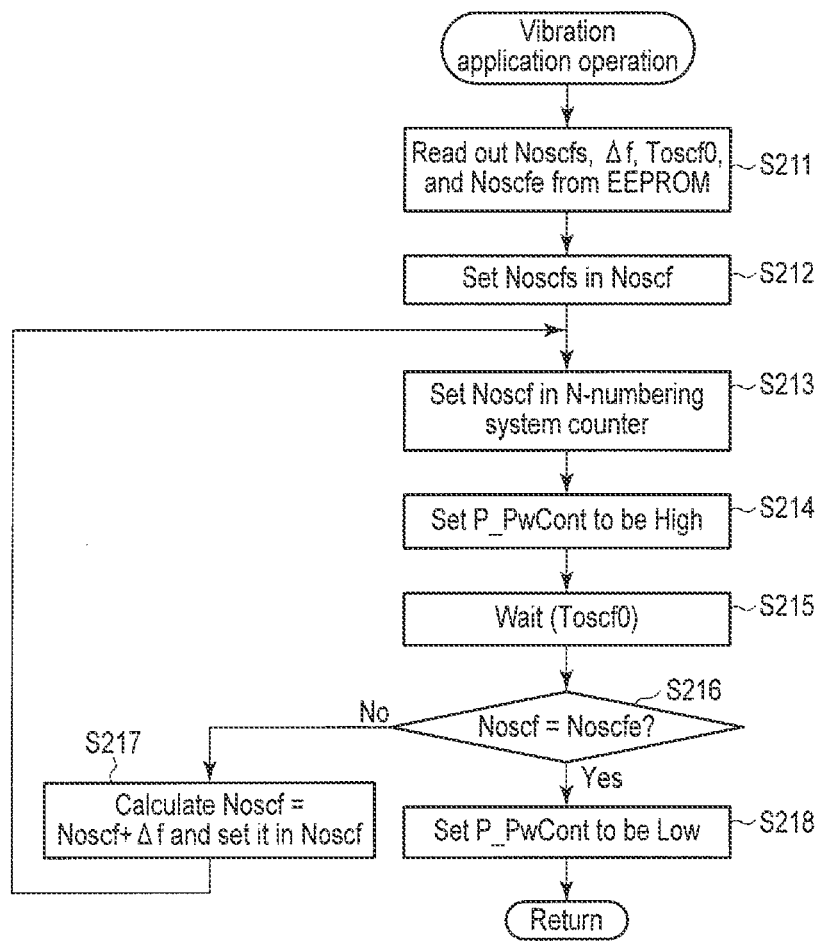
F I G. 20

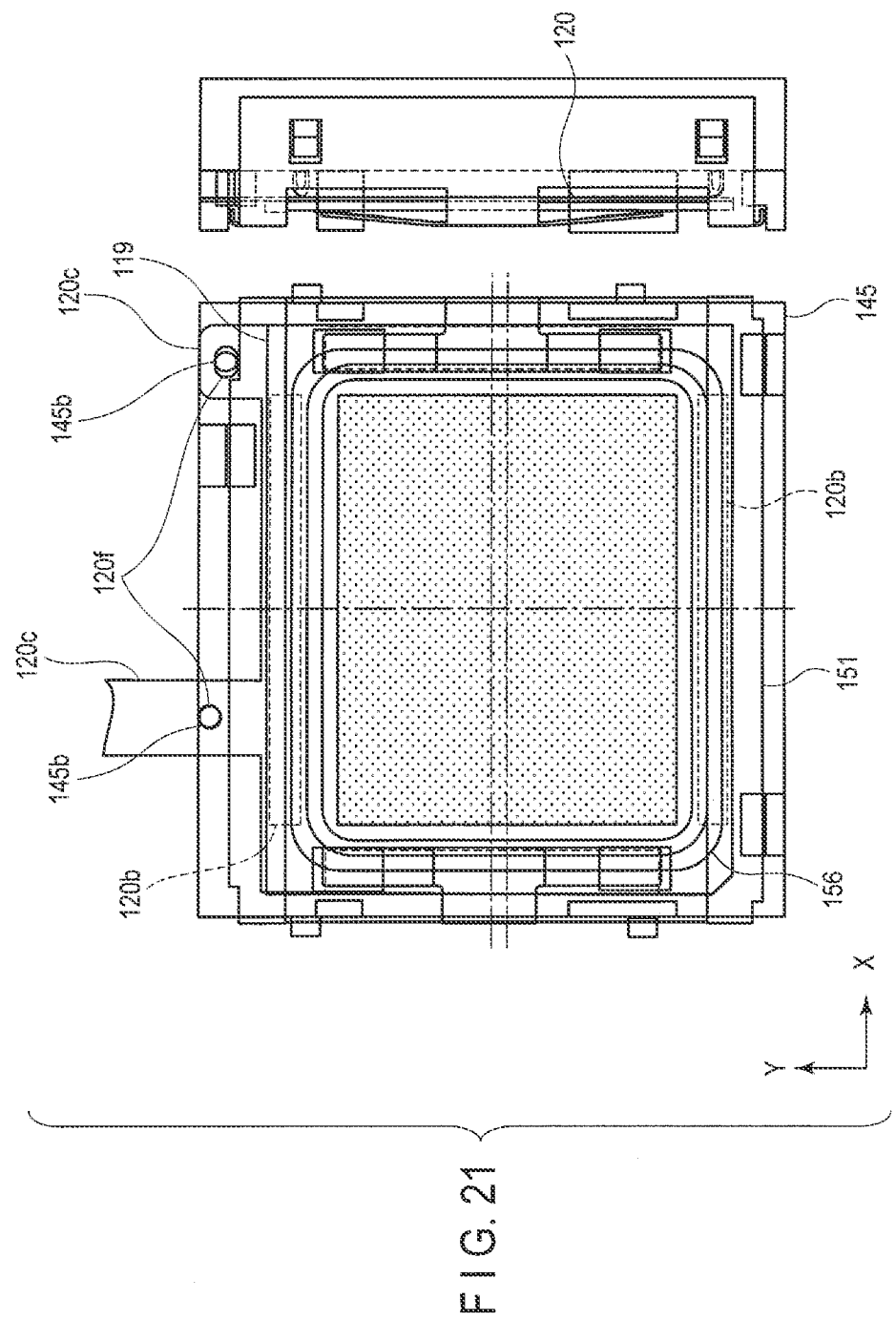
F I G. 21

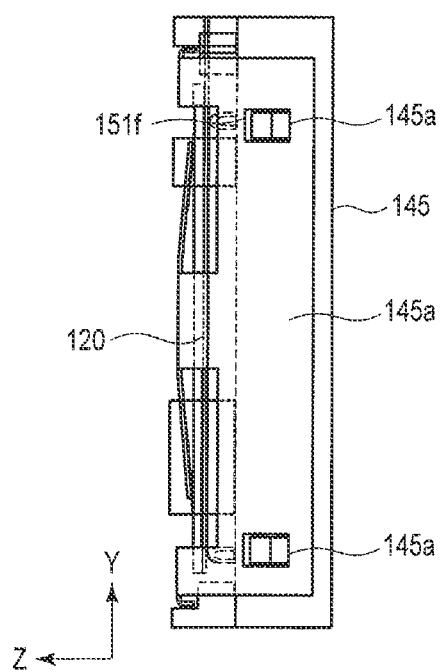
F I G. 22

VIBRATION APPARATUS AND IMAGING APPLIANCE

CROSS-REFERENCE TO RELATED APPLICATIONS

This application is based upon and claims the benefit of priority from the prior Japanese Patent Applications No. 2012-285908, Dec. 27, 2012 the entire contents of which are incorporated herein by reference.

BACKGROUND OF THE INVENTION

1. Field of the Invention

The present invention relates a vibration apparatus for vibrating a dust prevention member disposed at the front of an optical device, such as an image pickup device provided in an image pickup apparatus and configured to obtain an image signal corresponding to irradiation light on its photoelectric conversion surface, or a display device provided in an imaging appliance, e.g., an image projection apparatus, and configured to display an image projected on the screen. The present invention further relates an imaging appliance, such as an image pickup apparatus or image projection apparatus, equipped with this vibration apparatus.

2. Description of the Related Art

In recent years, there are imaging appliances utilizing optical devices, such as an image pickup apparatus using an image pickup device or an image projection apparatus using a display device of, e.g., a liquid crystal type. The image quality of images generated by imaging appliances of this kind has been remarkably improved. Accordingly, in such imaging appliances, if dust is deposited on the image pickup device or display device, or an optical device disposed near the above-mentioned device, the dust casts a shadow on the generated image and brings about a serious problem.

For example, there is an image pickup apparatus designed such that a camera main body is equipped with a photographing optical system detachably attached thereto. According to this image pickup apparatus, users can optionally use desired photographing optical systems by attaching/detaching them to interchange them with each other, as needed. Digital cameras of the so-called lens interchangeable type are currently in practical use such that a plurality of different-type photographing optical systems are selectively used relative to a single camera main body, as described above. However, in the case of digital cameras of the lens interchangeable type, when a photographing optical system is detached from the camera main body, dust suspended in the surrounding environment of the camera may infiltrate into the camera main body. Alternatively, in these digital cameras, when various types of mechanical operation mechanisms, such as a shutter and aperture mechanism, built in the camera main body are operated, foreign particles may be generated therefrom and deposited as dust on the surface of the image pickup device.

Projectors for viewing magnified projection images are currently in practical use, wherein a light source and a projection optical system are employed such that images displayed on a display device of the CRT type or liquid crystal type are magnified and projected onto a screen. In the case of these projectors, dust may be deposited on the surface of the display device and cast a shadow on the screen in a magnified and projected state.

Under the circumstances, there have been developed various types of mechanisms to remove dust deposited on the surface of optical devices inside imaging appliances. For example, Jpn. Pat. Appln. KOKAI Publication No. 2004-64555 discloses an electronic image pickup apparatus equipped with a dust removing mechanism, which is designed such that a circular glass plate (dust prevention member) is provided with an annular plate-shaped piezoelectric device (vibration application member) fixed to its peripheral portion, and the piezoelectric device is supplied with a frequency voltage having a predetermined frequency to generate a standing wave bending vibration concentric with the center of the circular glass plate, thereby removing dust deposited on the circular glass plate. The vibration generated by the predetermined vibration application frequency is a standing wave having concentric nodes. A dust prevention member receiving member is disposed in contact with the dust prevention member concentrically with the concentric nodes of the standing wave to support the dust prevention member and to provide dust prevention between image pickup devices.

Jpn. Pat. Appln. KOKAI Publication No. 2011-234055 discloses that a rectangular plate-shaped dust prevention member is provided with a strip shape piezoelectric device along its one side, and the piezoelectric device is configured to generate a vibration having a predetermined frequency to cause the dust prevention member to resonate, so that a standing wave is formed in a resonance vibration mode that generates a vibration concentric with the center of the dust prevention member. This publication further discloses the following matters: A plurality of standing wave vibration modes are generated by causing resonance with different frequencies to change the positions of vibration nodes so as to remove dust deposited at the vibration nodes of each vibration mode. Standing waves having different frequencies are generated to be substantially coincident with each other at a vibration node and the dust prevention member is supported by a support member at a position near the vibration node to reduce vibration loss. A frame-shaped seal having a lip shape in cross section is disposed between the image pickup face side and the dust prevention member to prevent dust from infiltrating.

Jpn. Pat. Appln. KOKAI Publication No. 2012-153023 discloses that a layered film having a high piezoelectric property (with a large piezoelectric "d" constant) can be formed by layered poly-L-lactic acid or poly-D-lactic acid layers and stretching them in a predetermined direction.

BRIEF SUMMARY OF THE INVENTION

A vibration apparatus according to an aspect of the present invention comprises: a plate-shaped dust prevention member including a light transmissive region having a predetermined area spread from a central portion in radial directions; a securing member disposed to have a predetermined gap between itself and the dust prevention member; a vibration application member fixed to a peripheral portion of the dust prevention member, including a flexible thin plate-shaped piezoelectric member, and configured to vibrate the dust prevention member; a support member disposed between the securing member and the dust prevention member or the vibration application member to surround a center of the dust prevention member; and an electrode formed of a conductive thin plate or film, disposed to partly or entirely holding the piezoelectric member, and partly extending outward relative to the dust prevention member.

An imaging appliance according to an aspect of the present invention comprises: an image surface configured to generate an optical image; a plate-shaped dust prevention member including a light transmissive region having a predetermined area spread from a central portion in radial directions, and disposed such that the light transmissive region faces the image surface with a predetermined gap therebetween; a securing member disposed to have a predetermined gap between itself and the dust prevention member; a vibration application member fixed to a peripheral portion of the dust prevention member, including a flexible thin plate-shaped piezoelectric member, and configured to vibrate the dust prevention member; a facing member disposed to surround a center of the dust prevention member and to face the dust prevention member or the vibration application member on a side closer to the image surface; a support member disposed between the facing member and the dust prevention member or the vibration application member and supports the dust prevention member or the vibration application member; and an electrode formed of a conductive thin plate or film, disposed to partly or entirely holding the piezoelectric member, and partly extending outward relative to the dust prevention member.

Advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 2 is a cross sectional view taken along a line A-A and showing an image pickup device unit including the vibration apparatus;

FIG. 4 is an exploded perspective view showing a vibrator for constituting the vibration apparatus;

FIG. 11 is a perspective view showing the vibrator in an assembled state in the vibration apparatus;

FIG. 15 is a view showing the structure of a dust prevention filter control circuit;

FIG. 17A is a flow chart of main control showing the control operation of a camera sequence (main routine) performed by a Bucom in the digital camera, i.e., the imaging appliance;

FIG. 20 is a flow chart showing a sub-routine control sequence of a vibration application operation in a digital camera according to a first modification of the present invention; FIG. 21 is a front view showing a vibration apparatus according to a second modification of the present invention; and FIG. 22 is a right side view showing this vibration apparatus.

DETAILED DESCRIPTION OF THE INVENTION

[Embodiment]

An embodiment of the present invention will now be described with reference to the accompanying drawings.

An imaging appliance specifically exemplified in this embodiment comprises an image pickup device unit configured to obtain image signals by photoelectric conversion and equipped with a dust removing mechanism. The imaging appliance will be explained as an improved technique concerning a dust removing function in an electronic camera (which will be simply referred to as a camera, hereinafter), as an example. Particularly, in this embodiment, an explanation will be given of a single-lens electronic camera (digital camera) of the lens interchangeable type with reference to FIGS. 1 to 3.

Figure 1:
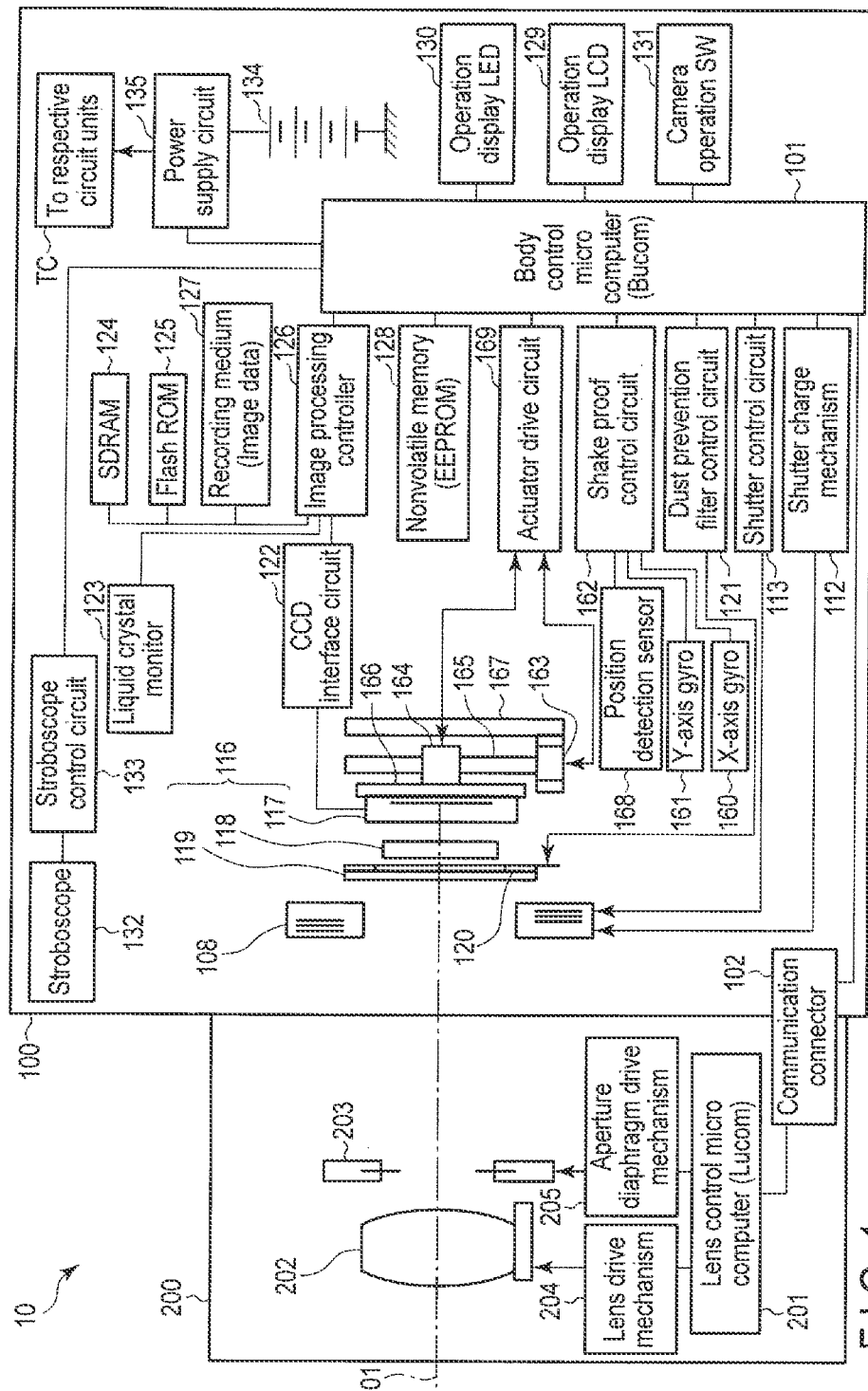
FIG. 1 is a block diagram schematically showing an example mainly of the electrical system configuration of a digital camera, which is an imaging appliance equipped with a vibration apparatus according to an embodiment of the present invention.
Figure 3:
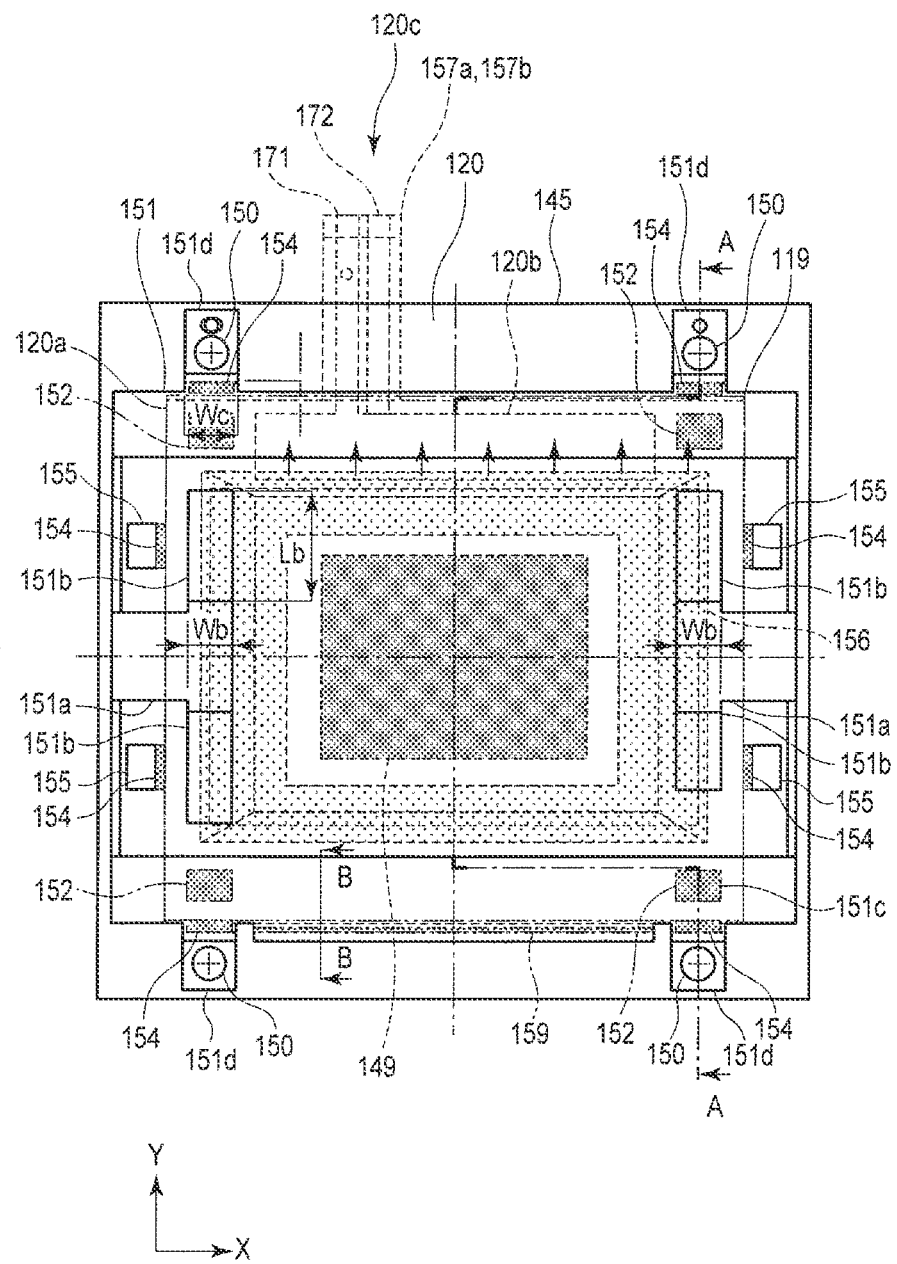
FIG. 3 is a front view showing the image pickup device unit including the vibration apparatus, seen from the lens side.

FIG. 1 is a block diagram schematically showing an example mainly of the electrical system configuration of a digital camera, which is an imaging appliance according to the present invention. FIG. 2 is a cross sectional side view showing an image pickup device unit of the digital camera including a dust removing mechanism. FIG. 3 is a front view showing the dust removing mechanism, seen from the lens side. FIG. 2 is a cross sectional view taken along a line A-A in FIG. 3.

Next, an example of the system configuration of the digital camera 10 will be explained with reference to FIG. 1.

The digital camera 10 includes a body unit 100 serving as a camera main body and a lens unit 200 serving as an interchangeable lens, which is one of the accessory apparatuses.

The lens unit 200 is detachably attached to a lens mount formed at the front of the body unit 100. The lens unit 200 is controlled by a lens control micro computer (which will be referred to as a Lucom, hereinafter) 201 provided to itself. The body unit 100 is controlled by a body control micro computer (which will be referred to as a Bucom, hereinafter) 101. If the lens unit 200 is attached to the body unit 100, the Lucom 201 and the Bucom 101 are electrically connected to each other to communicate with each other through a communication connector 102. The Lucom 201 and the Bucom 101 operate for the camera system such that the Lucom 201 collaborates with the Bucom 101 while the Lucom 201 serves as a subordinate.

The lens unit 200 includes a photographing lens 202 and an aperture diaphragm 203. The photographing lens 202 is driven by a stepping motor disposed inside a lens drive mechanism 204. The aperture diaphragm 203 is driven by a stepping motor disposed inside an aperture diaphragm drive mechanism 205. The Lucom 201 controls the respective stepping motors in accordance with instructions from the Bucom 101.

Inside the body unit 100, a shutter 108 of, e.g., the focal plane type is disposed on the photographing optical axis. The shutter 108 includes a front curtain and a rear curtain. Further, inside the body unit 100, a shutter charge mechanism 112 is provided to charge springs for driving the front curtain and rear curtain of the shutter 108, and a shutter control circuit 113 is provided to control movement of the front curtain and rear curtain.

An image pickup unit 116 is disposed on the photographing optical axis and configured to perform photoelectric conversion on a photographic subject image having passed through the above-mentioned optical system. The image pickup unit 116 is structured such that a CCD 117 serving as an image pickup device or image formation device, an optical low-pass filter (LPF) 118 disposed at the front of the CCD 117, and a dust prevention filter 119 serving as a dust prevention member are integrated and united.

The dust prevention filter 119 is provided with a piezoelectric device 120 attached to its peripheral portion and serving as a vibration application member. The piezoelectric device 120 includes a piezoelectric member and two electrodes with the piezoelectric member interposed therebetween. The piezoelectric device 120 is driven by a dust prevention filter control circuit 121 serving as driving means. The piezoelectric device 120 is driven at a frequency predetermined, for example, with reference to the size and/or material of the dust prevention filter 119 to generate a predetermined vibration in the dust prevention filter 119, thereby removing dust deposited on the filter surface of the dust prevention filter 119.

The image pickup unit 116 is equipped with a shake proof unit for hand shake correction.

The digital camera 10 includes a CCD interface circuit 122 connected to the CCD 117, a liquid crystal monitor 123, and an image processing controller 126 for processing images by use of an SDRAM 124 and a Flash ROM 125 both serving as storage areas. The digital camera 10 includes not only an electronic image pickup function but also an electronic record display function.

The electronic image pickup function includes a so-called through-image display function of displaying moving pictures on the liquid crystal monitor 123, based on and simultaneously with images photographed by the CCD 117, so as to serve as a finder, and a moving picture recording function of recording moving pictures. The finder function may be formed of a single-lens reflex finder of the optical type or the like.

A recording medium 127 can be selected from a various types of memory cards and external recording media, such an external HDD. The recording medium 127 is replaceably attached to the body unit 100 through a communication connector to communicate with the body unit 100. The recording medium 127 is configured to record image data obtained by photographing. As another storage area of the digital camera 10, a nonvolatile memory 128 is provided. The nonvolatile memory 128 stores predetermined control parameters necessary for camera control therein, and it is formed of an EEPROM, for example. The nonvolatile memory 128 is accessible by the Bucom 101.

The Bucom 101 is connected to an LCD 129 and an LED 130 both for indicating operations to inform users of operational states of the digital camera 10 by use of display output, a camera operation switch (SW) 131, and a stroboscope control circuit 133 for driving a stroboscope 132. The operation display LCD 129 or the operation display LED 130 includes a display portion for indicating a vibration operation of the dust prevention filter 119 during a period when the dust prevention filter control circuit 121 is operated. The camera operation switch (SW) 131 is a group of switches including operation buttons necessary for operating the digital camera 10, such as a release switch (SW), a mode change switch (SW), and a power switch (SW).

Inside the body unit 100, a battery 134 serving as a power supply and a power supply circuit 135 are provided. The power supply circuit 135 is configured to convert the voltage of the battery 134 into voltages necessary for respective circuit units TC for constituting the digital camera 10 and to supply the voltages thus converted to the circuit units TC. Further, inside the body unit 100, a voltage detection circuit is provided to detect voltage changes when an electric power is supplied from an external power supply through a jack.

The respective portions of the digital camera 10 designed as described above are operated schematically as follows.

The image processing controller 126 controls the CCD interface circuit 122 to take in image data from the CCD 117 in accordance with instructions from the Bucom 101. The image data from the CCD 117 is converted into a video signal by the image processing controller 126 and is output to and displayed by the liquid crystal monitor 123. Users can confirm finder images or photographed images by watching images displayed on the liquid crystal monitor 123.

The SDRAM 124 is a memory for temporarily storing image data, and is used as a work area when image data is converted. Image data is converted into, e.g., JPEG data and is stored in the recording medium 127. If image data corresponds to moving pictures, the image data is converted into, e.g., MPEG data.

When the photographing lens 202 is focused, the focusing operation proceeds such that image pickup is performed while the position of the photographing lens 202 is sequentially changed; then the position where pickup images have the highest contrast is calculated by the Bucom 101; then the position with the highest contrast is transmitted through the communicate connector 102 to the Lucom 201; and then the position of the photographing lens is controlled by the Lucom 201 with reference to the position with the highest contrast. Photometry is performed by a well known photometry process based on light quantity detected from the pickup images.

Next, an explanation will be given of the image pickup unit 116 including the CCD 117 with reference to FIGS. 2 and 3.

The image pickup unit 116 includes the CCD 117 serving as an image pickup device, the optical LPF 118, the dust prevention filter 119 serving as a dust prevention member, and the piezoelectric device 120 serving as a vibration application member. The CCD 117 is configured to obtain an image signal corresponding to a photographic subject luminous flux transmitted through the photographing optical system and radiated onto its photoelectric conversion surface. The optical LPF 118 is disposed on the photoelectric conversion surface side of the CCD 117 and is configured to remove a high frequency component from the photographic subject luminous flux transmitted and radiated through the photographing optical system. The dust prevention filter 119 is disposed opposite to the front side of the optical LPF 118 with a predetermined gap therebetween.

The piezoelectric device 120 is disposed on the peripheral edge portion of the dust prevention filter 119 and is configured to apply a predetermined vibration to the dust prevention filter 119. Although the piezoelectric device 120 is attached annularly along the peripheral portion of the dust prevention filter 119, it may be disposed to entirely cover the dust prevention filter 119.

Signal electrodes 171 and 172 are provided as electrodes for applying a voltage signal to the dust prevention filter 119. The signal electrodes 171 and 172 are respectively held by insulation sheets 157a and 157b, and they partly extend outward relative to the dust prevention filter 119 and connected to the dust prevention filter control circuit 121. For example, each of the insulation sheets is formed of a polyimide sheet. Each of the signal electrodes 171 and 172 includes an electrical connection part connected to a board with the filter control circuit 121 formed thereon, by use of a method of connection to a flexible printed board, such as solder connection, conductive adhesive connection, or connector connection.

A filter receiving member 144 formed of an elastic member, such as rubber, is interposed between the CCD 117 and the optical LPF 118. The filter receiving member 144 is disposed at that position of the peripheral edge portion on the front side of the CCD 117, which does not interfere with the effective area of the photoelectric conversion surface. The filter receiving member 144 is set in contact with the optical LPF 118 near the peripheral edge portion on the back side of the optical LPF 118 to maintain approximate airtightness between the CCD 117 and the optical LPF 118. A holder 145 is disposed to cover the CCD 117 and the optical LPF 118 in an airtight state.

The holder 145 has a rectangular opening 146 formed in a portion almost central around the photographing optical axis. The opening 146 has a step portion 147 formed in the inner peripheral edge portion on a side near the dust prevention filter 119. The step portion 147 has an almost L-shape in cross section. The optical LPF 118 and the CCD 117 are fitted in the opening 146 from the back side of the opening 146. The optical LPF 118 is disposed such that its peripheral edge portion on the front side is brought into almost airtight contact with the step portion 147. Consequently, the position of the optical LPF 118 in the photographing optical axis direction is regulated by the step portion 147, so that the optical LPF 118 is prevented from slipping out from the inside of the holder 145 to the front side.

The holder 145 has a dust prevention filter receiving portion 148 formed over the entire circumference of the peripheral edge portion on the front side. The dust prevention filter receiving portion 148 is located at an outer side than the step portion 147 and at a more front side than the step portion 147, so that the dust prevention filter 119 is held in front of the optical LPF 118 with a predetermined gap interposed therebetween. The opening portion on the inner peripheral side of the dust prevention filter receiving portion 148 serves as an image forming light beam passing area 149, as shown in FIG. 3. The dust prevention filter receiving portion 148 has a step portion formed over the entire circumference on the inner peripheral side, and an annular seal 156 is disposed on this step portion.

The seal 156 is formed of a soft material, such as rubber, and is positioned by fitting its inner peripheral portion to the step portion. The seal 156 expands in a quadrangular pyramidal shape to form a lip portion extending forward. Thus, the seal 156 has an annular lip portion. The seal 156 is disposed between the peripheral portion of the dust prevention filter 119 and the dust prevention filter receiving portion 148. The reverse side of the dust prevention filter 119 is set in press contact with the tip of the lip portion to almost hermetically seal the space between the front side of the optical LPF 118 and the reverse side of the dust prevention filter 119.

Figure 6:
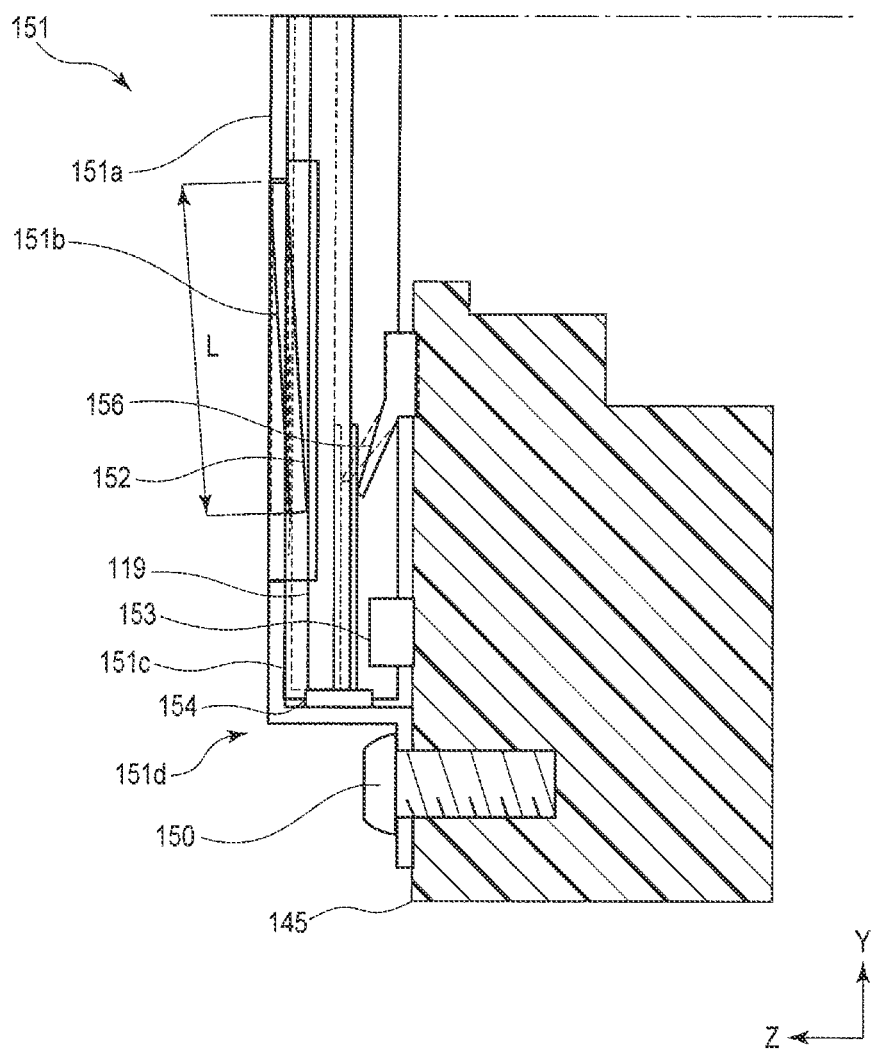
FIG. 6 is a cross sectional view showing a main part of a pressing mechanism for constituting the vibration apparatus.

The dust prevention filter 119 is formed of a plate-shaped elastic member. A pressing member 151 is disposed on an annular portion, which is a portion shaped like an almost quadrangle frame in this example, along the outer periphery of the dust prevention filter 119. The pressing member 151 supports the dust prevention filter 119 by pressing it to the dust prevention filter receiving portion 148 of the holder 145. The pressing member 151 includes a plurality of fixing portions 151d extending outward, as shown in FIG. 6, which are fixed to the dust prevention filter receiving portion 148 by screws 150.

The pressing member 151 includes arm support portions 151a extending inward from the pressing member 151 and arms 151b extending from the end of the arm support portions 151a along the outer periphery of the dust prevention filter 119 such that the arms 151b serve as a plurality of plate springs. The dust prevention filter 119 having a polygonal plate shape as a whole, which has a quadrangle plate shape in this example, is pressed by the arms 151b in the optical axis 01 direction (Z-direction), and is supported by the dust prevention filter receiving portion 148 through the seal 156. Plate-shaped receiving members 152 formed of a material having a vibration attenuating property, such as rubber or resin, are interposed between the pressing member 151 and the dust prevention filter 119. With this arrangement, the dust prevention filter 119 is press-supported such that the vibration of the dust prevention filter 119 is not hindered.

The position of the dust prevention filter 119 in the Y-direction is determined such that the dust prevention filter 119 is received, through respective support members 154, by Z-direction bent portions at the root of the fixing portions 151d of the pressing member 151. The position of the dust prevention filter 119 in the X-direction is determined such that the dust prevention filter 119 is received, through respective support members 154, by support portions 155 formed on the holder 145, as shown in FIG. 3. Each of the support members 154 is formed of a material having a vibration attenuating property, such as rubber or resin, so as not to hinder the vibration of the dust prevention filter 119.

In this camera, the positions of the receiving members, i.e., the pressing positions for the dust prevention filter 119, do not need to be positioned at a node Ta (see FIG. 14) of a vibration generated in the dust prevention filter 119, as described later. However, if the pressing positions for the dust prevention filter 119 are positioned at a node Ta, the vibration of the dust prevention filter 119 is not hindered. The dust prevention filter 119 comes to provide a high-efficiency dust removing mechanism with a large vibration amplitude A.

The dust prevention filter 119 is supported by the dust prevention filter receiving portion 148 through the seal 156 and the piezoelectric device 120 fixed to the dust prevention filter 119. The piezoelectric device 120 is formed of a thin resin sheet. The piezoelectric device 120 is fixed to the peripheral portion of the dust prevention filter 119 or fixed all over the dust prevention filter 119. Since the piezoelectric device 120 is flat, the space including the opening 146 is set in an airtight state when the piezoelectric device 120 is pressed by the lip portion of the seal 156.

The lip portion of the seal 156 having an annular shape supports the dust prevention filter 119. If this supporting position agrees to a node of a vibration generated in the dust prevention filter 119, the vibration of the dust prevention filter 119 is hardly hindered, and so a high-efficiency dust removing mechanism with a large vibration amplitude A is of course provided.

If the pressing force to the dust prevention filter 119 is set to be 2N (newtons) or less, the vibration of the dust prevention filter 119 is hardly hindered, even if the position press-supported by the pressing member 151 or the seal 156 does not agree to a vibration node.

As explained with reference to FIGS. 2 and 3, the image pickup unit 116 is formed as an airtight structure equipped with the holder 145 having a desired size to mount the CCD 117.

Receiving members 153 are disposed on the dust prevention filter receiving portion 148 at positions correspond to the receiving members 152. If the dust prevention filter 119 is displaced by an external force in the pressing direction, the receiving members 153 receive the piezoelectric device 120 fixed to the dust prevention filter 119.

Since the receiving members 153 receive portions of the dust prevention filter 119 reinforced by the piezoelectric device 120, the dust prevention filter 119 have higher strength against the pressing force. The pressing member 151 includes support portions 151*c* formed near the positions of the fixing portions 151*d*. The support portions 151*c* are arranged along the peripheral portion of the dust prevention filter 119. The support portions 151*c* are disposed to face the front side of the dust prevention filter 119 with a predetermined gap therebetween, so that they receive the dust prevention filter 119 when the dust prevention filter 119 is displaced, by this predetermined gap amount, by an external force in the anti-pressing direction.

Since the support portions 151*c* are disposed near the fixing portions 151*d*, the distance from them to the positions where the Z-direction bent portions are in contact with the outside of the dust prevention filter 119 are very small. Further, since the bending spring constant of the support portions 151*c* that support the dust prevention filter 119 is very large, displacement of the arms 151*b* is very small even if they receive a large force in the anti-pressing direction. Accordingly, the maximum displacement amount of the arms 151*b* is a predetermined displacement amount that almost agrees to the gap between the front side of the dust prevention filter 119 and the support portions 151*c*.

Thus, although the arms 151*b* have low rigidity with a small spring constant and thus they are easy to deform, displacement of the arms 151*b* is suppressed to be a predetermined small value, so that the arms 151*b* are prevented from being broken due to a large displacement by an external force, and from releasing hold of the dust prevention filter 119. Since the support portions 151*c* are integrally formed with the pressing member 151 and have a plate-like shape, the space necessary for the pressing member 151 is not so different from that of the conventional pressing mechanism. Even when an external force in this direction is applied, the dust prevention filter 119 is received by the pressing member 151 at the peripheral portion reinforced by the piezoelectric device 120, and so the dust prevention filter 119 can have high strength.

More specifically, if the pressing member 151 shown in FIG. 3 is formed of a metal plate, such as a phosphor bronze plate for springs, a beryllium copper plate for springs, or a stainless steel plate for springs, or a resin material having high bending strength, the spring constant kb of each arm 151*b* is expressed by the following formula (1), where the arm 151*b* has a plate thickness "t", a Young's modulus E, a width Wb, and a length Lb (extending length).

$$kb = (1/4) \cdot (E \cdot Wb \cdot t^3)/Lb^3 \qquad (1)$$

On the assumption that each support portion 151*c* is a simple cantilever, the spring constant kc thereof is expressed by the following formula (2), where the cantilever has a width Wc, a length Lc, a plate thickness "t", and a Young's modulus E.

$$kc = (1/4) \cdot (E \cdot Wc \cdot t^3)/Lc^3 \qquad (2)$$

Each support portion 151*c* shown in FIG. 3 is not a simple cantilever but has a spring constant larger than the value calculated by the formula (2). However, for the sake of simplified explanation, the minimum value of the spring constant kc is calculated by assuming that the support portion 151*c* is a cantilever. In the above-mentioned two formulas (1) and (2), by assuming that the width Wb of each arm 151*b* and the width Wc of the cantilever of each support portion 151*c* are expressed Wb≈Wc, the ratio kc/kb between the respective spring constants kb and kc is expressed by the following formula (3), i.e., this ratio is inversely proportional to the third power of the ratio between the respective lever lengths Lb and Lc.

$$kc/kb = 1/(Lc/Lb)^3 \qquad (3)$$

Furthermore specifically, if each arm 151*b* has a length Lb=5 mm, and each support portion 151*c* has a length Lc=0.5 mm, the spring constant ratio is expressed by kc/kb=1,000, and so the spring constant kc of each support portion 151*c* is 1,000 times as large as the spring constant kb of each arm 151*b*. It can be considered that rigidity is higher as deformation by a predetermined force is smaller and that the rigidity ratio is proportional to the spring constant ratio, and so the rigidity of each support portion 151*c* is 1,000 times as large as the rigidity of each arm 151*b*.

The piezoelectric device 120 is provided with the two signal electrodes 171 and 172 extending outward relative to the outer periphery of the dust prevention filter 119. The signal electrodes 171 and 172 are disposed to holding a piezoelectric member 120*a* of the piezoelectric device 120. The piezoelectric device 120 is configured to generate a predetermined vibration in a piezoelectric element portion 120*b* of the piezoelectric member 120*a* when the piezoelectric element portion 120b is supplied with a predetermined electric signal from the dust prevention filter control circuit 121 through the signal electrodes 171 and 172.

The extending portions of signal electrodes 171 and 172 are respectively held by the insulation sheets 157a and 157b. Each of the insulation sheets 157a and 157b is formed of a resin sheet, such as a polyimide sheet of several tens of μm or less. Each of the signal electrodes 171 and 172 is formed of, e.g., a copper foil of 10 μm or less. Since the signal electrodes 171 and 172 are flexible, they hardly attenuate the vibration of the piezoelectric element portion 120b and so they do not leak the vibration outward from the extending portions 120c. If the signal electrodes 171 and 172 are respectively provided with the extending portions 120c at positions where the vibration amplitude A is small, or the vibration has a node as described later, the vibration attenuation is further suppressed.

In a case where a hand shake correction mechanism is included, the dust prevention filter 119 and/or piezoelectric device 120 are moved relative to the body unit 100. If the dust prevention filter control circuit 121 is disposed on a member integrated with the body unit 100, the abovementioned movement causes the extending portions 120c to be deformed and displaced along with an operation of the hand shake correction mechanism. The extending portions 120c are flexible and thin, they are effective for downsizing and for operation load reduction of the hand shake correction mechanism.

The dust prevention filter 119 can be compact and thin, and the piezoelectric device 120 is thin and light because it is made of resin. The dust prevention filter 119 and the piezoelectric device 120 have small mass, and so the energy necessary for driving the holder 145 is small. These conditions are optimum to a camera equipped with a hand shake correction mechanism.

Figure 5:
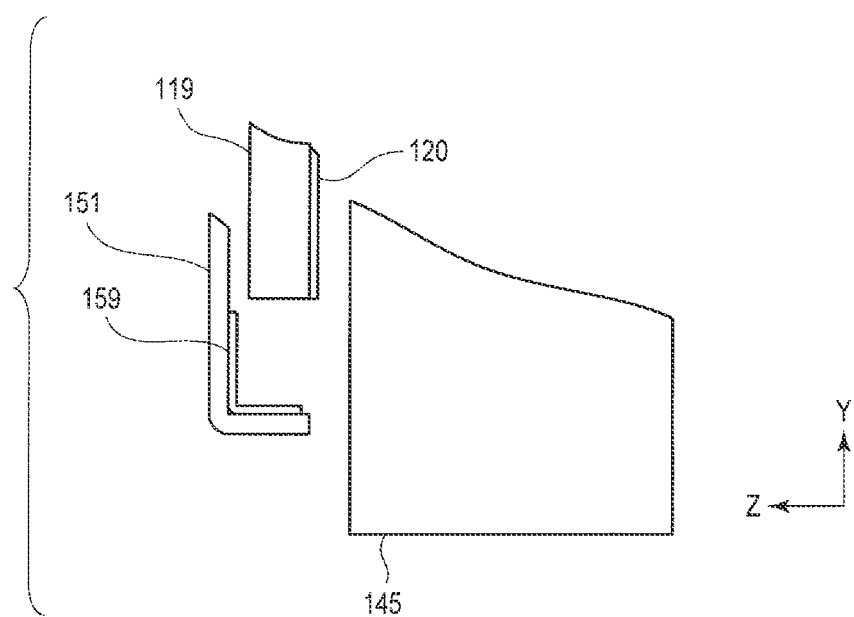
FIG. 5 is a partial cross sectional view showing a dust holding part for constituting the vibration apparatus.

As described later, dust separated from the surface of the dust prevention filter 119 is dropped downward from the body unit 100 due to an inertia force of the vibration of the dust prevention filter 119 and the action of gravity. In this embodiment, as shown in FIG. 5, the pressing member 151 is bent in the Z-direction near the lower end of the dust prevention filter 119. The Z-direction bent portion of the pressing member 151 is provided with a holding material 159, such as an adhesive material or adhesive tape. The holding material 159 reliably holds dropped dust to prevent the dust from returning to the surface of the dust prevention filter 119.

Next, a brief explanation will be given of a hand shake correction function. As shown in FIG. 1, the hand shake correction mechanism includes an X-axis gyro 160, a Y-axis gyro 161, a shake proof control circuit 162, an X-axis actuator 163, a Y-axis actuator 164, an X-frame portion 165, a Y-frame portion 166 (holder 145), a frame 167, a position detection sensor 168, and an actuator drive circuit 169. The X-axis gyro 160 detects an angular velocity of hand shake about the X-axis of the camera. The Y-axis gyro 161 detects an angular velocity of hand shake about the Y-axis of the camera. The shake proof control circuit 162 is configured to calculate a hand shake compensation amount based on an angular velocity signal output from the X-axis gyro 160 and an angular velocity signal output from the Y-axis gyro 161, and to displace the CCD 117 to compensate the CCD 117 for shakes respectively in the X-axis direction (first direction) and the Y-axis direction (second direction) orthogonal with each other on the X-Y plane, which is orthogonal with the photographing optical axis, whose direction is defined as the Z-axis direction.

In the hand shake correction mechanism, predetermined drive signals are sent from the actuator drive circuit 169 to the X-axis actuator 163 and the Y-axis actuator 164 to drive the X-axis and Y-axis actuators 163 and 164. The X-axis actuator 163 drives the X-frame portion 165 in the X-axis direction. Along with this, the Y-axis actuator 163 drives the Y-frame portion 166 (holder 145), which supports the CCD 117 of the image pickup unit 116, in the Y-axis direction. Consequently, the X-frame portion 165 and the Y-frame portion 166 move relative to the frame 167 serving as the movement reference, to shift the CCD 117 in the X-axis direction and the Y-axis direction.

Each of the X-axis actuator 163 and Y-axis actuator 164 is formed of, e.g., a combination of a electromagnetic rotary motor and a screw feed mechanism, a linear electromagnetic motor using a voice coil motor, or a linear piezoelectric motor. The position detection sensor 168 detects the positions of the X-frame portion 165 and Y-frame portion 166. The shake proof control circuit 162 uses positional information from the position detection sensor 168 or velocity information obtained by differentiation of the positional information to adjust the Y-frame portion 166 supporting the CCD 117 to a position with shake correction. Along with this, the shake proof control circuit 162 controls the actuator drive circuit 169 not to drive the X-axis actuator 163 and the Y-axis actuator 164 beyond the displacement movable range.

Next, a more detailed explanation will be given of the dust removing mechanism with reference to FIGS. 4 to 12.

Figure 7:
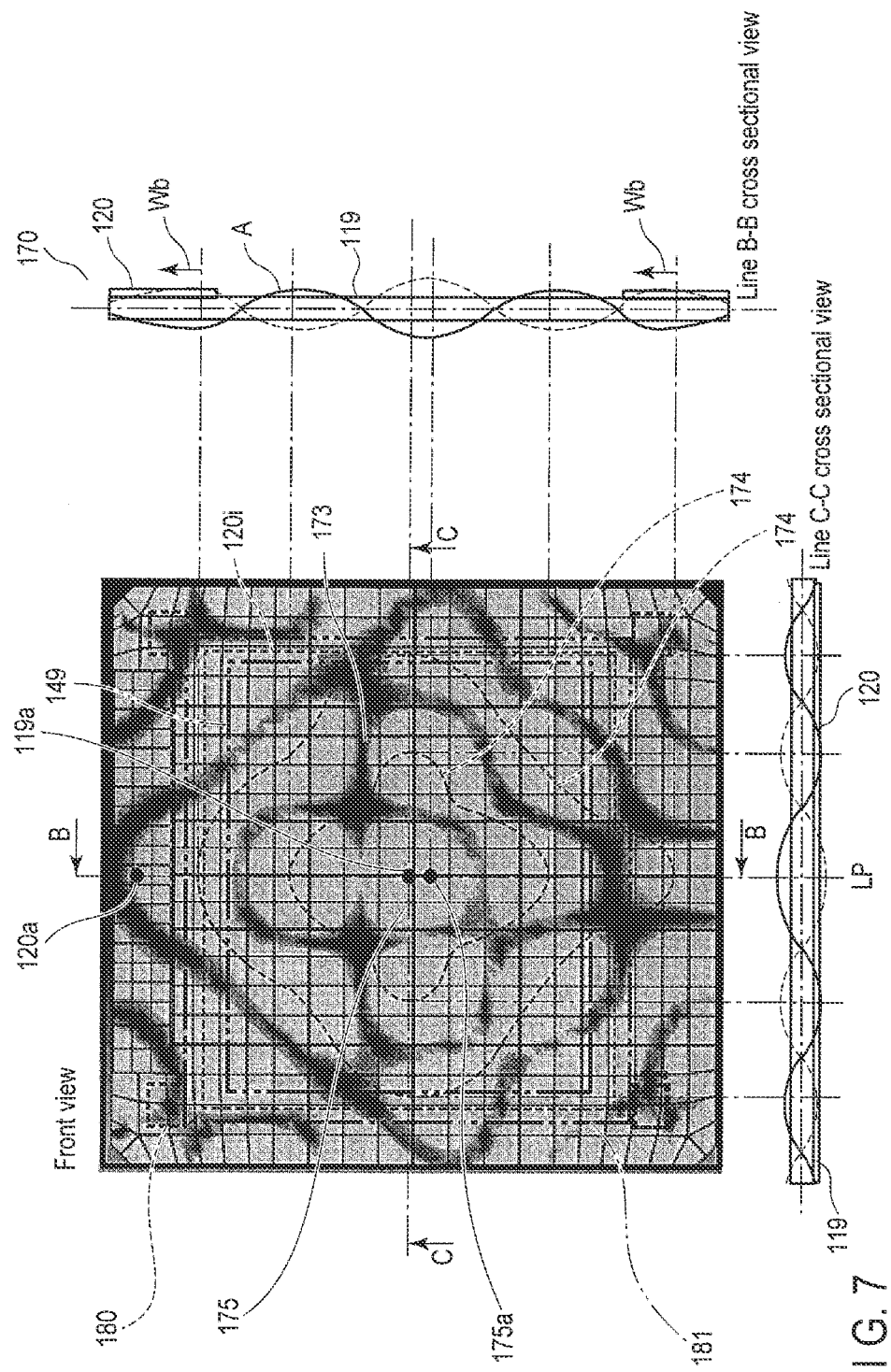
FIG. 7 is a view for explaining a manner of vibration generated in a dust prevention filter in the imaging appliance.
Figure 8:
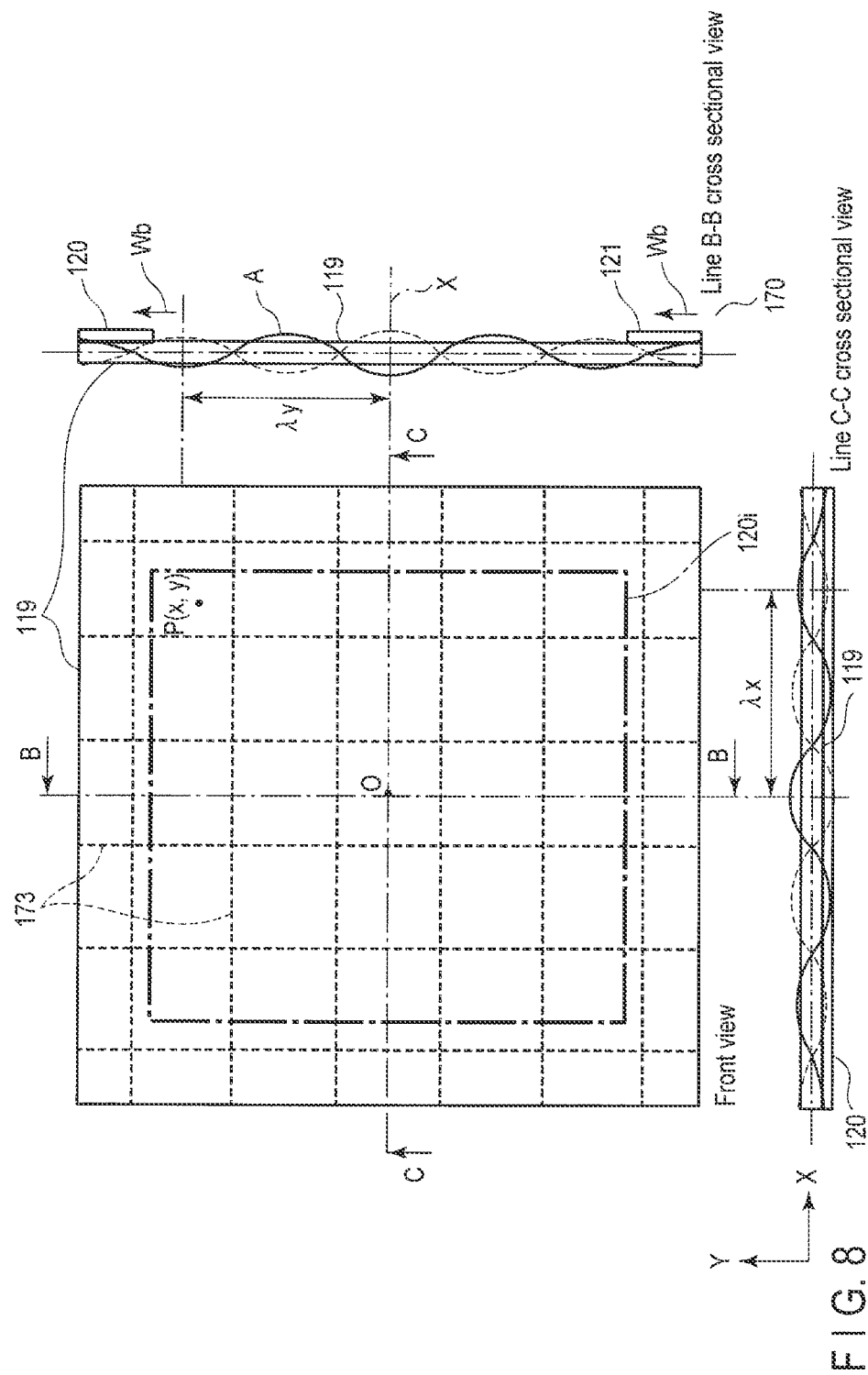
FIG. 8 is a view for explaining the concept of vibration generation in the dust prevention filter in the imaging appliance.
Figure 9:
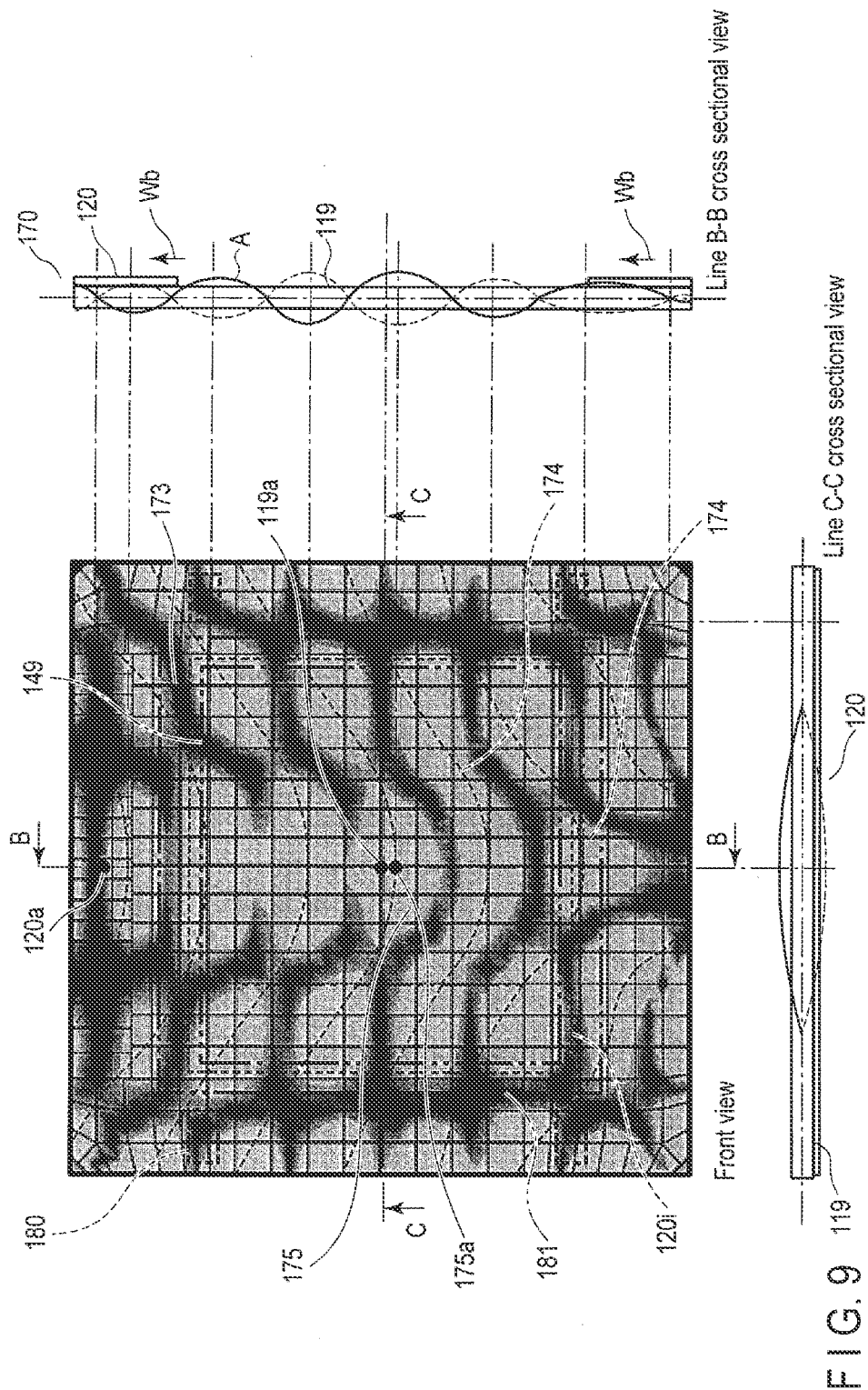
FIG. 9 is a view for explaining a different manner of vibration generated in the dust prevention filter in the imaging appliance.
Figure 10:
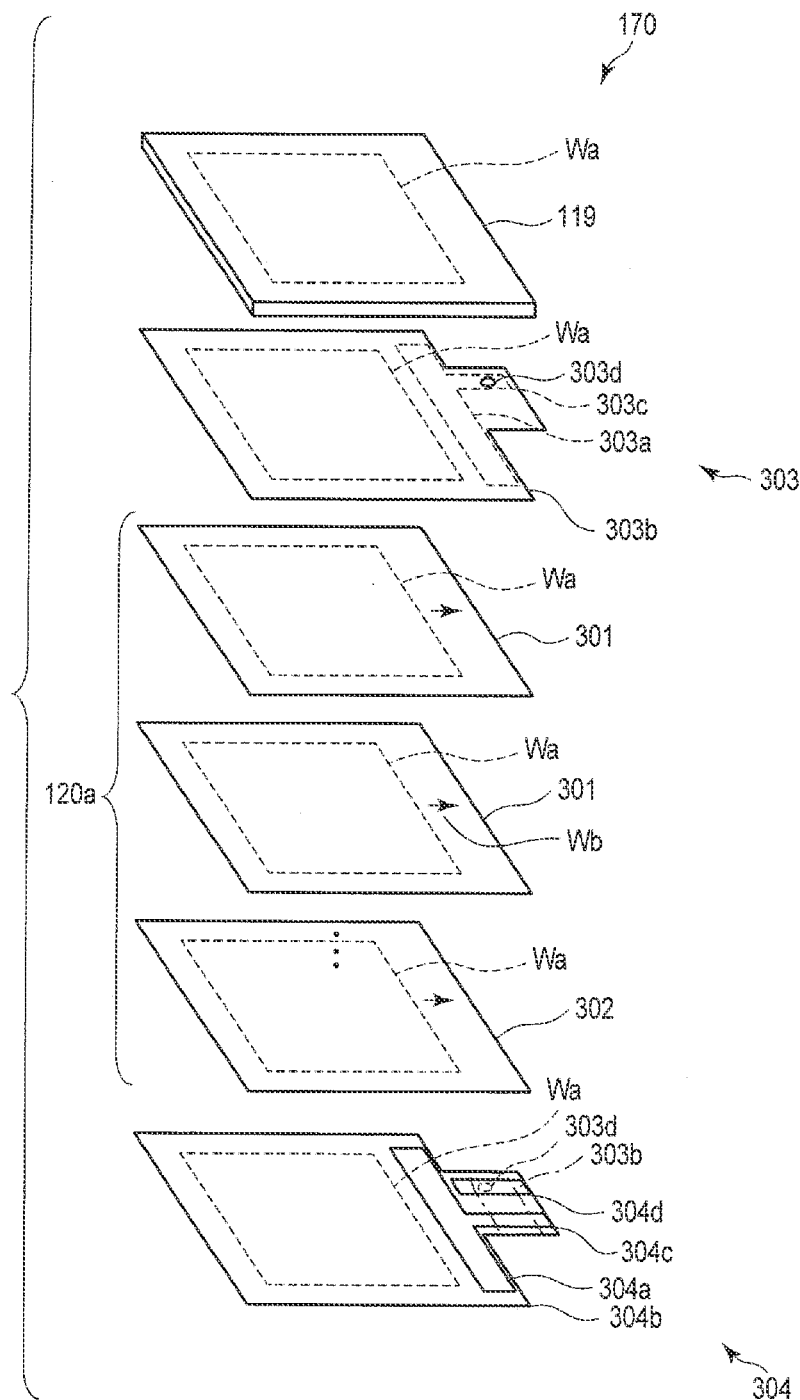
FIG. 10 is an exploded perspective view for explaining the structure of the vibrator in the vibration apparatus.
Figure 12A:
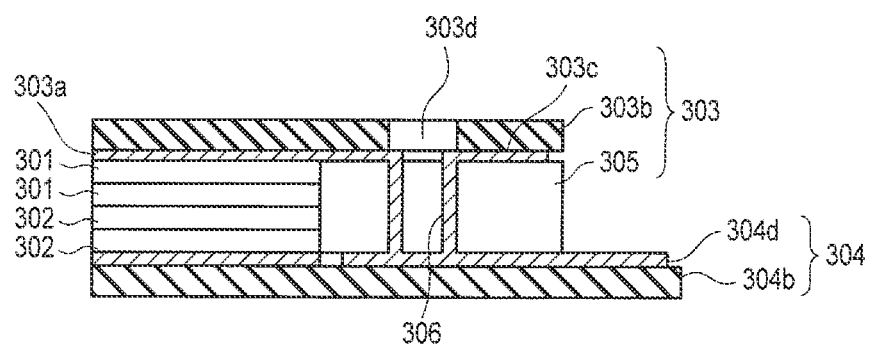
FIG. 12A is a cross sectional structural view taken along a line E-E and showing the electrical connection part of a piezoelectric device in the vibration apparatus.
Figure 12B:
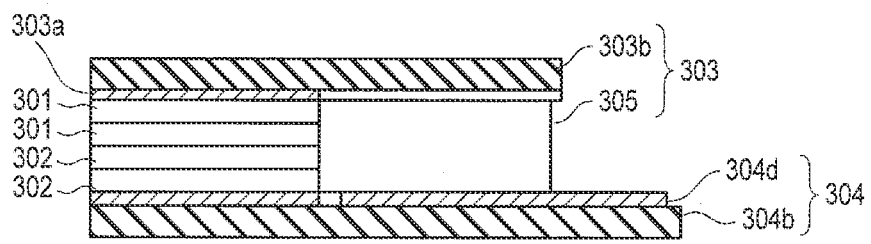
FIG. 12B is a cross sectional structural view taken along a line F-F and showing the electrical connection part of the piezoelectric device in the vibration apparatus.
Figure 13A:
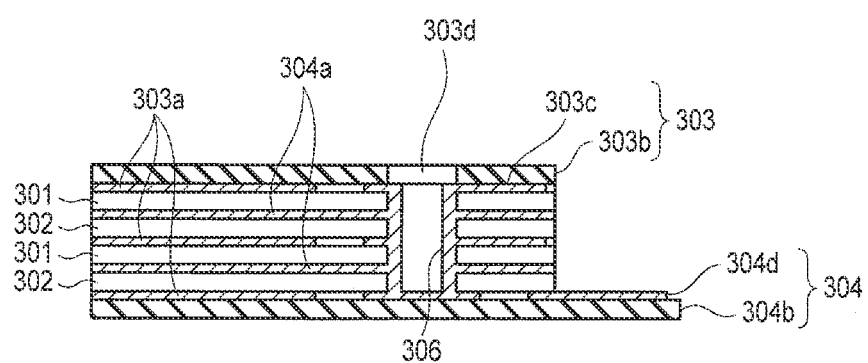
FIG. 13A is a cross sectional view showing a modification of the vibrator, which is a piezoelectric device, in the vibration apparatus.
Figure 13B:
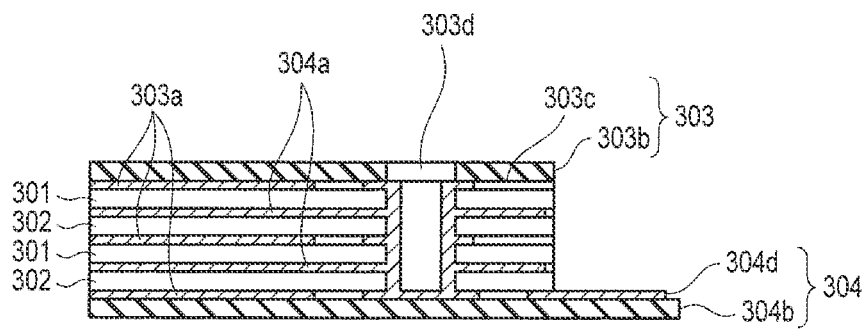
FIG. 13B is a cross sectional view showing another modification of the vibrator, which is a piezoelectric device, in the vibration apparatus.
Figure 14:
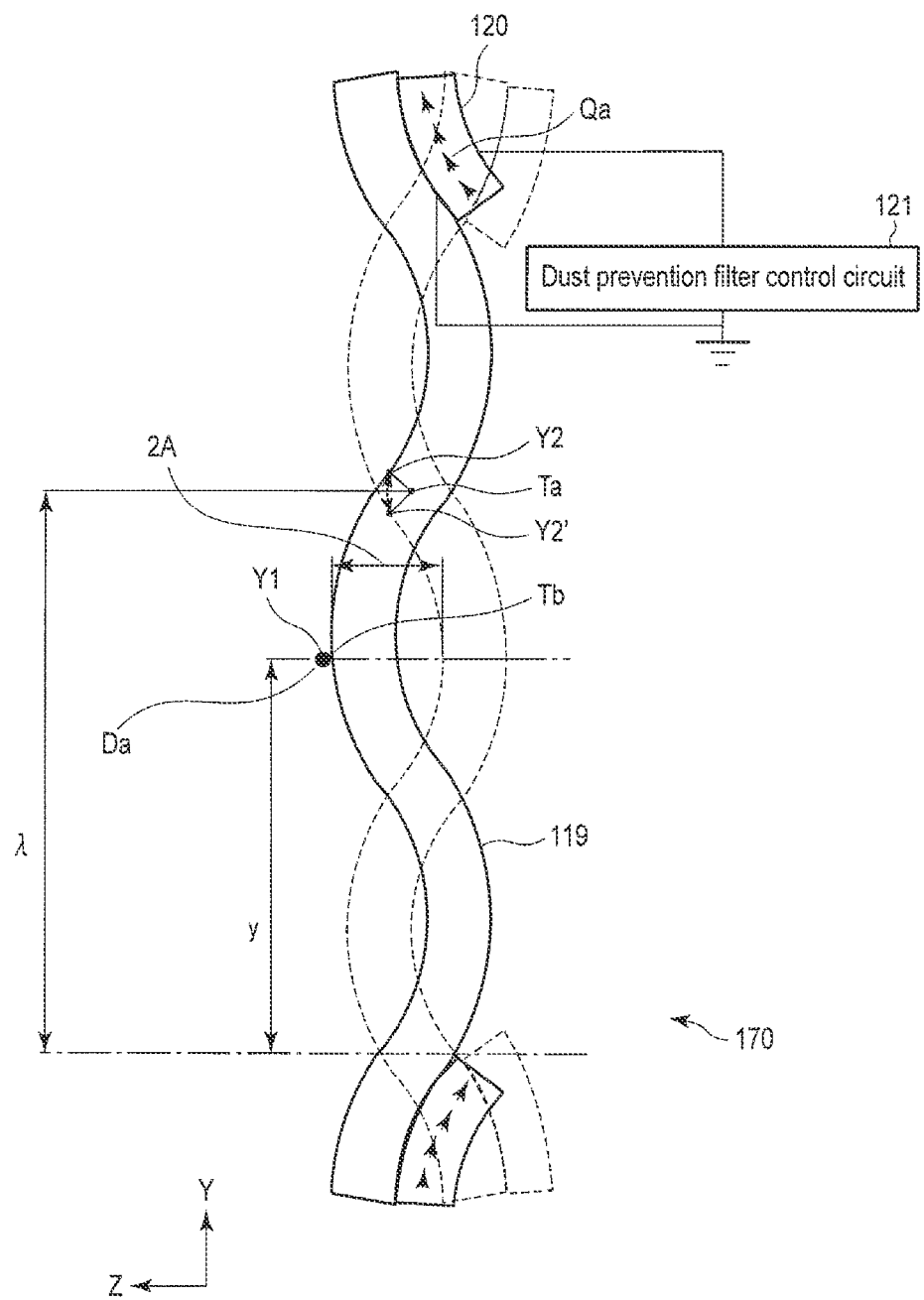
FIG. 14 is a conceptual diagram for explaining a standing wave generated in the dust prevention filter.

FIG. 4 is an exploded perspective view showing a main part (vibrator) for constituting the dust removing mechanism. FIG. 5 is a cross sectional view taken along a line B-B in FIG. 3 and showing a part for holding dust removed by the dust prevention filter 119. FIG. 6 shows a main part of the pressing mechanism for constituting the vibration apparatus, in a cross section the same as that of FIG. 2, for explaining a state where the dust prevention filter 119 receives an external force in the anti-pressing direction. FIG. 7 is a view for explaining a manner of vibration (vibration mode "1") generated in the dust prevention filter 119, and showing the dust prevention filter 119 with a front view, a line B-B cross sectional view, and a line C-C cross sectional view. FIG. 8 is a view for explaining the concept of vibration generation in the dust prevention filter 119, and showing the dust prevention filter 119 with a front view, a line B-B cross sectional view, and a line C-C cross sectional view. FIG. 9 is a view for explaining a different manner of vibration (vibration mode "2") generated in the dust prevention filter 119, and showing the dust prevention filter 119 with a front view, a line B-B cross sectional view, and a line C-C cross sectional view. FIG. 10 is an exploded perspective view showing the structure of the piezoelectric device. FIG. 11 is a perspective view showing the piezoelectric device. FIGS. 12A and 12B show the structure of an electrical connection part of the piezoelectric device, wherein FIG. 12A is a line E-E cross sectional structural view of the electrical connection part of the piezoelectric device, and FIG. 12B is a line F-F cross sectional structural view of the electrical connection part of the piezoelectric device. FIGS. 13A and 13B are cross sectional views showing a different form of the piezoelectric device, wherein FIG. 13A is a cross sectional view showing a modification of the vibrator 170, and FIG. 13B is a cross sectional view showing another modification of the vibrator 170. FIG. 14 is a conceptual diagram of the dust prevention filter 119 for explaining a standing wave generated in the dust prevention filter 119, and corresponds to the line B-B cross sectional view shown in FIG. 7.

The dust prevention filter 119 includes at least one side of the peripheral line, which is symmetric relative to a symmetric axis. The dust prevention filter 119 is like a plate having a polygonal shape as a whole, such as a quadrangle shape, and more specifically a rectangular shape. The dust prevention filter 119 includes a light transmissive transparent portion at least having a predetermined area spread in the radial directions from a position where the maximum vibration amplitude A is obtained. The dust prevention filter 119 may have another shape as a whole, such as a circular shape, a D-shape formed by linearly cutting one side of the circular shape, or a quadrangle shape having two arc-shaped lateral sides along with upper and lower linear sides. The dust prevention filter 119 is set by the attaching means described above such that the transparent portion faces the front side of the optical LPF 118 with a predetermined gap interposed therebetween.

The piezoelectric device 120 serving as a vibration application member for applying a vibration to the dust prevention filter 119 is disposed, by use of, e.g., sticking means, such as an adhesive, at the peripheral edge portion on one side of the dust prevention filter 119, which is the back side in this example. The vibrator 170 is formed by disposing the piezoelectric device 120 on the dust prevention filter 119. When the piezoelectric device 120 is supplied with a predetermined frequency voltage, the vibrator 170 causes a resonance vibration to generate a bending vibration with a large amplitude, as shown in FIG. 7.

As shown in FIG. 4, for example, the piezoelectric device 120 has a rectangular outline shape as a whole, and it is assembled such that the piezoelectric member 120a formed of a light transmissive resin sheet is fixed to the insulation sheets 157a and 157b respectively provided with the signal electrodes 171 and 172 disposed to holding the rectangular area at the upper side of the piezoelectric member 120a. The signal electrodes 171 and 172 are present on one of the long sides of the rectangular piezoelectric member 120a. The piezoelectric member 120a includes an opening formed therein at a position corresponding to the image forming light beam passing area of the photographing lens. Each of the insulation sheets 157a and 157b also includes an opening, or a light transmissive member, formed therein at a position corresponding to the image forming light beam passing area of the photographing lens.

The signal electrodes 171 and 172 and parts of the insulation sheets 157a and 157b extend outward relative to the dust prevention filter 119. The ends of the extending portions are respectively provided with terminals electrically connected to the dust prevention filter control circuit 121. If a drive voltage with a predetermined cycle is output from the dust prevention filter control circuit 121, this drive voltage is supplied through the extending portions and the respective signal electrodes 171 and 172 to the piezoelectric device 120, so that the vibrator 170 causes a resonance vibration, as described above. Consequently, a two-dimensional standing wave bending vibration is generated in the dust prevention filter 119, as shown in FIG. 7. FIG. 4 shows a stretch direction Wb in the piezoelectric member 120a.

Next, the standing wave bending vibration will be explained.

The bending vibration shown in FIG. 7 renders a standing wave vibration. In the front view of the dust prevention filter 119 shown in FIG. 7, the band-shaped black areas denote vibration node areas (areas where the vibration amplitude A is small) 173, where the vibration amplitude A is smaller as the black color is thicker. The mesh in the front view of the dust prevention filter 119 shown in FIG. 7 denotes a mesh according to a finite element method.

If the vibration velocity is large, if the intervals of the node areas 173 are small, as shown in the front view of the dust prevention filter 119 shown in FIG. 7, a large planar vibration is generated at the node areas 173 and so a large inertia force in the planar vibration direction is applied to dust present at the node areas 173. At this time, looking at the movement of a mass point Y2 as described later with reference to FIG. 14, the point causes an arc-shaped vibration between Y2 and Y2' about a node Ta as the center.

If the surface of the dust prevention filter 119 is inclined in parallel with gravity to cause a force to act along the surface on which dust deposited, both of the inertia force and gravity act on dust deposited at the node areas 173 to remove the dust.

In the front view of the dust prevention filter 119 shown in FIG. 7, the white areas denote areas where the vibration amplitude A is large. Dust deposited at the white areas are removed by an inertia force given by the vibration. Dust deposited at the node areas 173 of the vibration can be also removed by a different vibration mode that causes vibration application having an amplitude at the node areas 173.

The bending vibration mode shown in FIG. 7 is formed by a synthesis of an X-direction bending vibration and a Y-direction bending vibration. FIG. 8 shows a manner of the basic state of this synthesis. In this case, a vibrator 170 is arranged such that two piezoelectric devices 120 and 121 are disposed symmetric relative to the central axis X of the dust prevention filter 119. If this vibrator 170 is placed on a member that hardly attenuates the vibration, such as a sponge, and is caused to perform a free vibration thereon, a vibration mode that brings about latticed node areas 173 shown in FIG. 8 is easily obtained, in general, (see Jpn. Pat. Appln. KOKAI Publication No. 2011-234055 mentioned above). The vibration mode shows a state where a standing wave bending vibration with a wavelength Xx is generated in the X-direction, a standing wave bending vibration with a wavelength Xy is generated in the Y-direction, and the two standing waves are synthesized.

If the point O shown in FIG. 8 is used as the original points of x=0 and y=0, a vibration Z(x,y) in the Z-direction at an optional point P(x,y) is expressed by the following formula (4), where A is the amplitude (although this value is deemed as a constant value in this example, this value is actually variable depending on the vibration mode and/or the electric power input into the piezoelectric device), "m" and "n" are degrees of a natural vibration corresponding to the vibration mode and they are positive integers including 0, and y is an optional phase angle.

$$Z(x,y) = A \cdot Wmn(x,y) \cdot \cos(\gamma) + A \cdot Wnm(x,y) \cdot \sin(\gamma) \quad (4)$$

This formula can be analyzed as follows.

$$Wmn(x,y) = \sin(n\pi \cdot x + \pi/2) \cdot \sin(m\pi \cdot y + \pi/2)$$

$$Wnm(x,y) = \sin(m\pi \cdot x + \pi/2) \cdot \sin(n\pi \cdot y + \pi/2)$$

On the assumption that, for example, the phase angle γ=0 is set, the formula (4) is converted to the following formula (5).

$$Z(x, y) = A \cdot Wmn(x, y) \quad (5)$$
$$= A \cdot \sin(n \cdot \pi \cdot x / \lambda x + \pi/2) \cdot \sin(m \cdot \pi \cdot y / \lambda y + \pi/2)$$

In this formula, if λx=λy=λ=1 is satisfied ("x" and "y" are expressed by using the bending wavelength as a unit length), the following formula (6) is obtained.

$$Z(x, y) = A \cdot Wmn(x, y) \qquad (6)$$
$$= A \cdot \sin(n \cdot \pi \cdot x + \pi/2) \cdot \sin(m \cdot \pi \cdot y + \pi/2)$$

FIG. 8 shows a vibration mode where the natural vibration degrees satisfy m=n. In the case of m=n, the degrees and wavelengths in the X-direction and Y-direction are the same, the shape of the dust prevention filter 119 is square. In this vibration mode, the ridges, nodes, and troughs of the vibration appear at regular intervals in the X-direction and Y-direction, and so the vibration node areas 173 appear in a grid pattern (conventional vibration mode).

A vibration mode with m=0 and n=1 provides a vibration forming ridges, nodes, and troughs in parallel with a side of the peripheral line parallel with the Y-direction (side LB).

In the case of the above-mentioned vibration mode providing a grid pattern or a pattern parallel with one side, vibrations in the X-direction and Y-direction merely appear independently of each other. Even at the intersections of the X-direction and Y-direction in the grid pattern vibration, the vibrations are not synthesized to enlarge the vibration amplitude A.

On the other hand, if the dust prevention filter 119 is set to have a rectangular shape slightly elongated, it is possible to provide a vibration mode having a very large vibration amplitude A (the maximum amplitude has the same level obtained by the conventional circular dust prevention filter), even where a piezoelectric device is disposed along one side of the peripheral line, as in this embodiment. At this time, the dust prevention filter 119 has the vibration mode shown in FIG. 7. In this vibration mode, although the dust prevention filter 119 is rectangular, the ridges of the vibration amplitude A form ridgelines 174 that are closed curves relative to the optical axis center. In this vibration mode, a reflected wave from a side in the X-direction and a reflected wave from a side in the Y-direction are efficiently synthesized to form a standing wave. In FIG. 7, the reference symbol 120i denotes the inner periphery of the piezoelectric device 120.

FIG. 9 shows a vibration mode generated when the vibration application frequency is changed in the dust prevention filter 119 shown in FIG. 7. In this vibration mode, the ridges of the vibration amplitude A form ridgelines 174 that surround the center of a side of the peripheral line.

FIG. 10 is a view for explaining the structure of the piezoelectric device 120 in detail, and it is an exploded perspective view showing the vibrator 170 comprising the piezoelectric device 120 and the dust prevention filter 119. The piezoelectric member 120a is structured such that first piezoelectric sheets 301 each formed of a thin film sheet of poly-D-lactic acid (with a thickness of about 1 μm to 10 μm) and second piezoelectric sheets 302 each formed of a thin film sheet of poly-L-lactic acid (with a thickness of about 1 μm to 10 μm) are alternately layered.

Each of the first piezoelectric sheets 301 and the second piezoelectric sheets 302 has an effective light beam transmissive region Wa almost at the central portion to transmit light beams. The effective light beam transmissive region Wa is formed of a light transmissive transparent part or hole not to block image forming light beams from the photographing lens. The first piezoelectric sheets 301 and the second piezoelectric sheets 302 have been stretched in the process of manufacturing. This stretch direction is orthogonal with the long sides of the first electrode 303a and the second electrode 304a disposed along a side forming the outline of the dust prevention filter 119.

A first electrode sheet 303 is fixed at a surface of the piezoelectric member 120a. A second electrode sheet 304 is fixed at the reverse surface of the piezoelectric member 120a. A first electrode 303a is formed on the first electrode sheet 303 and a second electrode 304a is formed on the second electrode sheet 304 such that they face each other. The piezoelectric element portion 120b, which is a part of the piezoelectric member 120a, is sandwiched between the first electrode 303a and the second electrode 304a.

The first electrode 303a is fixed to the first insulation sheet 303b formed of a polyimide sheet (with a thickness of several tens of μm or less). The second electrode 304a is fixed to the second insulation sheet 304b formed of a polyimide sheet (with a thickness of several tens of μm or less). Each of the first electrode 303a and the second electrode 304a has an effective light beam transmissive region Wa at the central portion. The first electrode sheet 303 and the second electrode sheet 304 partly extend outward relative to the dust prevention filter 119 to respectively form the extending portions 120c. The extending portions 120c respectively include a first electrical connection part 303c and a second electrical connection part 304c respectively extending from the first electrode 303a and the second electrode 304a. The respective end portions of the first electrical connection part 303c and the second electrical connection part 304c are exposed to be connectable to the dust prevention filter control circuit 121. The first electrical connection part 303c is connected to a first electrical connection part 304d through the inner periphery surface of a hole 303d.

FIG. 10 shows the piezoelectric element member hold between the two electrodes as an example to make the explanation simple. In practice, however, the piezoelectric element may be held by three or more electrodes.

FIG. 11 is a perspective view showing the vibrator 170 shown in FIG. 10 in an assembled state. Since the details of the vibrator 170 have been explained with reference to FIG. 10, they will not be explained for FIG. 11.

FIG. 12A is a cross sectional view taken along the line E-E in FIG. 10, and FIG. 12B is a cross sectional view taken along the line F-F in FIG. 10.

FIGS. 13A and 13B show a modification of the vibrator 170 by cross sectional views respectively corresponding to FIGS. 12A and 12B. The vibrator 170 shown in FIGS. 13A and 13B differs from the structure shown in FIGS. 12A and 12B such that a plurality of first electrodes 303a and a plurality of second electrodes 304a are respectively disposed on the front and back sides of a plurality of first piezoelectric sheets 301 and a plurality of second piezoelectric sheets 302.

The vibrator 170 may be structured such that the first piezoelectric sheets 301 and the second piezoelectric sheets 302 are alternately layered one by one, or alternately layered every several sheets, as a matter of course. The first electrode 303a disposed on a side facing the dust prevention filter 119 may be formed on the dust prevention filter and the first insulation sheet 303b may be omitted. In FIGS. 12A and 12B, the reference symbol 305 denotes a cover sheet and the reference symbol 306 denotes an electrical connection part of a through-hole.

Instead of sandwiching the piezoelectric sheets between two electrodes as described above, three or more electrodes may be layered to hold the piezoelectric element member. Stronger vibration may be produced, if a greater number of electrodes are layered.

Next, a detailed explanation will be given of dust removal with reference to FIG. 14.

FIG. 14 shows a cross section the same as that shown by the line B-B cross sectional view in FIG. 7. If the piezoelectric member 120a, which has been stretched in a direction indicated by arrows Qa in FIG. 14, is supplied with a predetermined frequency voltage to generate a resonance bending vibration, the vibrator 170 comes into a state indicated by solid lines at a certain time point t0. A mass point Y1 present at an optional position "y" on the surface of the vibrator 170 has a vibration "z" in the Z-direction at an optional time "t", which is expressed by the following formula (7), where the vibration has an angular velocity ω and a Z-direction amplitude A, along with Y=2πy/λ (λ: bending vibration wavelength).

$$z = A \sin(Y) \cdot \cos(\omega t) \quad (7)$$

This formula represents the standing wave vibration shown in FIG. 7. Accordingly, at a position of y=s·λ/2 ("s" is an integer), Y=s·π is derived, and sin(Y) comes to zero になる. Accordingly, this standing wave vibration has a node Ta at every λ/2 where the Z-direction vibration amplitude A becomes zero, regardless of time "t".

The state indicated by broken lines in FIG. 14 shows a state at t=kπ/ω (k is an odd number) where the vibration is in the reverse phase as compared to the state at time t0. According to this vibrator 170, the piezoelectric device 120 is bent only in a predetermined direction, in either case where the application voltage is negative or positive. However, when the bending vibration is reflected at an end face of the vibrator 170, a phase shift is caused and the bending reflected wave thus reflected is superposed with the compulsive bending wave of the piezoelectric device 120, so that a resonance bending standing wave is formed.

Then, the vibration of the point Y1 on the dust prevention filter 119 comes to a position in the vibration anti-node Tb of the bending standing wave, and so the vibration amplitude A becomes A, and the position z(Y1) of the point Y1 in the Z-direction is expressed by the following formula (8).

$$z(Y1) = A \cdot \cos(\omega t) \quad (8)$$

The vibration velocity Vz(Y1) of the point Y1 is expressed by the following formula (9), which is obtained by differentiating the formula (8) by time, where the vibration has a frequency "f" and so ω=2πf is derived.

$$Vz(Y1) = d(z(Y1))/dt = -2\pi f \cdot A \cdot \sin(\omega t) \quad (9)$$

The vibration acceleration αz(Y1) of the point Y1 is expressed by the following formula (10), which is obtained by further differentiating the formula (9) by time.

$$\alpha z(Y1) = d(Vz(Y1))/dt = -4\pi^2 f^2 \cdot A \cdot \cos(\omega t) \quad (10)$$

Accordingly, dust Da deposited at the point Y1 receives the acceleration expressed by the formula (10).

The inertia force Fk which the dust Da receives is expressed by the following formula (11), where the dust Da has a mass M.

$$Fk = \alpha z(Y1) \cdot M = -4\pi^2 f^2 \cdot A \cdot \cos(\omega t) \cdot M \quad (11)$$

The formula (11) shows that it is effective to make the frequency "f" higher because the inertia force Fk becomes larger along with an increase in the frequency. However, if the vibration amplitude A is small at this time, the inertia force Fk cannot be larger even though the frequency "f" is set higher. In general, when the piezoelectric device 120 for generating the vibration energy of vibration application has a constant size, the piezoelectric device 120 can generate only a predetermined vibration energy. Accordingly, if the frequency "f" is set higher in the same form vibration mode, the vibration amplitude A is inversely proportional to the second power of the frequency "f". If the resonance frequency is set higher to obtain a higher order resonance mode, the vibration amplitude A is smaller and the vibration velocity is not increased, and so the vibration acceleration does not become higher. Rather than that, if the frequency "f" is set higher, it is difficult to ideally cause resonance, and so the vibration energy loss is increased and the vibration acceleration is lower. Accordingly, when a vibration is generated simply by a resonance mode, a mode having a large amplitude can be hardly obtained, and the effect of dust removal is extremely deteriorated.

It is preferable that the dust prevention filter 119 shown in FIG. 14 is supported at a vibration node Ta. If it is supported at a vibration anti-node Tb, the generated vibration is hindered, and so the vibration acceleration is extremely lowered, thereby deteriorating the performance of removing the dust Da.

According to this embodiment, the cantilever arms 151b are disposed along the peripheral portion of the dust prevention filter 119, and the pressing force to the dust prevention filter 119 is set to be 2N or less, so that the vibration is almost hardly hindered even if a portion at a vibration anti-node Tb is supported.

The lowest set value Fmin of the pressing force to the dust prevention filter 119 is expressed by Fmin>g·m, where "m" is the mass of the vibrator 170 and "g" is the gravity acceleration (the gravity acceleration 1 G=9.8 m/s²), to prevent the vibrator 170 from being displaced only by a change of the posture of the vibration apparatus. More specifically, it is expressed by Fmin=2·g·m.

The dust prevention filter 119 having the shape and material described above is a glass plate having a plate thickness of about 0.5 mm or less with m=about 1.5 g or less, and so the lowest set value Fmin of the pressing force is about 0.03N or more. In consideration of variations in components and assembling operations, it is multiplied by a safety coefficient of about 10 times, and so the lowest set value Fmin of the pressing force is preferably set at about 0.3N.

On the assumption that an imaging appliance, such as a digital camera, is dropped or the like, there is a case predicted where the dust prevention filter 119 receives an external force F with an acceleration of about several hundreds of G, and more specifically of 500 G, which results in an external force F=7.35N. If the pressing force is set at 0.3N, the external force is 24.5 times as large as the pressing force, with which the conventional pressing member allows a large displacement and easily causes plastic deformation.

According to this embodiment, the pressing member 151 includes the support portions 151c having rigidity about 1,000 times or more (further, the spring constant is also 1,000 times or more) larger than the rigidity of the arms 151b that generate the pressing force. Accordingly, after the arms 151b are deformed by a predetermined amount, the support portions 151c are displaced by a displacement amount Z1 while receiving an external force F'=F−Δf, which is calculated by subtracting a force Δf necessary for the arms 151b to be deformed by the predetermined amount. At this time, the peripheral portion of the dust prevention filter 119 also receives the external force F', but the piezoelectric device 120 made of a resin material and fixed to the peripheral portion of the dust prevention filter 119 protects the dust prevention filter 119 from the external force F', which is an impulsive force, in this embodiment.

The following formulas (12) and (13) are satisfied, where each support portion 151$c$ has a spring constant k1, each arm 151$b$ renders a displacement amount Z2 due to a predetermined pressing force F1, and each arm 151$b$ has a spring constant k2.

$$F'=Z1 \cdot k1, F1=Z2 \cdot k2 \quad (12)$$

$$Z1/Z2=F'/F1 \cdot k2/k1 \quad (13)$$

Further, the following formula (14) is obtained on the assumption that k1/k2=1,000, F'=7.35N, and F1=0.3N.

$$Z1/Z2=1/41 \quad (14)$$

In this case, the displacement amount of the support portions 151$c$ is 1/41 of the displacement amount of the arms 151$b$, and so they do not receive a large stress. Further, the space necessary for the pressing members 151 is almost the same as the space necessary for the conventional pressing mechanism. In the practical use, it is preferably set at about Z1/Z2=1/10, and, in this case, the rigidity (spring constant) of each support portion 151$c$ is preferably set to be about 250 times larger than that of each arm 151$b$.

The dust prevention filter 119 is rectangular, but the vibration mode "1" shown in FIG. 7 according to this embodiment is performed such that the ridges of the vibration amplitude A form ridgelines 174 that are closed curves relative to the optical axis center. The vibration mode "2" shown in FIG. 9 according to this embodiment is performed such that the ridges of the vibration amplitude A form ridgelines 174 that are curves surrounding the center of a side of the peripheral line, so that a reflected wave from a side in the X-direction and a reflected wave from a side in the Y-direction are efficiently synthesized to form a standing wave. In the case of the vibration mode "1" shown in FIG. 7, the maximum vibration velocity at the central portion is Vmax1, which is the largest value among all of the vibration modes.

In the case of the vibration mode "2" shown in FIG. 9, the maximum vibration velocity at the central portion is decreased to a value above 70% relative to the vibration mode "1". Further, in the vibration mode "2", the maximum vibration velocity at the central portion is about 40% or less of the maximum vibration velocity at the central portion obtained by the vibration mode "1", and is the lowest vibration velocity. However, when the pressing force is set at about 1N, this vibration mode "2" provides a vibration velocity close to that obtained by setting the pressing force at about zero. Accordingly, the pressing mechanism according to this embodiment is sufficiently effective.

In the case of the vibration mode "1", when the pressing force is set at about 2N, the vibration velocity significantly changes relative to the pressing force, but, when the pressing force is set at about 1N, a vibration velocity of about Vmax1 is ensured while the vibration velocity does not change relative to variations in the pressing force, and thus a stable pressing mechanism can be realized. In the vibration mode "1", even if the pressing force is set at about 2N, the pressing mechanism according to this embodiment can form long cantilever arms 151$b$ along the outer periphery of the dust prevention filter 119 to set the spring constant of the arms 151$b$ smaller. Consequently, the change of the pressing force relative to the displacement of the arms 151$b$ becomes smaller, so that the pressing force less fluctuates relative to variations in components and assembling operations.

As described above, in the vibration mode "2" according to the embodiment, a reflected wave from a side in the X-direction and a reflected wave from a side in the Y-direction are efficiently synthesized to form a standing wave. In order to efficiently form this synthesized standing wave, the shape and dimensions of the dust prevention filter 119 are greatly contributable. when the ratio of the short side relative to the long side of the dust prevention filter 119, which is called an aspect ratio (short side/long side), is set at 1, it becomes square. As compared with the square, if the dust prevention filter 119 is prepared such that the aspect ratio is smaller than 1, the Z-direction vibration velocity at the center position of the dust prevention filter 119 is largest even where the piezoelectric element portion 120$b$ is formed only at one place. In practice, the aspect ratio (short side/long side) of dust prevention filter 119 is preferably set to be 0.9 or more and less than 1. The piezoelectric element portion 120$b$ is a portion to be supplied with a signal voltage in the piezoelectric device 120.

As described above, according to the vibration in which the ridges of the vibration amplitude A form ridgelines 174 that are closed curves relative to the optical axis center and the vibration in which ridgelines 174 are curves surrounding the center of a side of the peripheral line, they can generate a vibration velocity at a level corresponding to the amplitude of a concentric vibration generated by a case where the dust prevention filter 119 has a circular disk shape. In the case of a vibration mode that simply generates a vibration amplitude A in parallel with one side of the peripheral line, it can merely provide a vibration acceleration in a fraction, which is larger than about one tenth, of that obtained by the vibration mode "1" shown in FIG. 7.

Further, according to the vibration in which the ridges of the vibration amplitude A form ridgelines 174 that are closed curves and the vibration in which ridgelines 174 are curves surrounding the center of a side of the peripheral line, the vibration velocity is largest at the center of the vibrator 170, and the vibration amplitude A is smaller as the closed curves or surrounding curves are closer to the periphery. Since the performance of removing dust is higher near the center of the image, if the center of vibrator 170 is set to agree to the optical axis, it is possible to advantageously prevent dust Da from being imprinted more reliably at the center where the image quality is high.

As regards the node areas 173 of the image forming light beam passing area 149 where the vibration amplitude A is smaller, the drive frequency supplied to the piezoelectric device 120 can be of course changed to cause resonance by different vibration modes (more specifically, the vibration modes shown in FIGS. 8 and 9), so that the positions of nodes 177 are changed to facilitate removal of dust Da.

As shown in FIGS. 7 and 9, support areas 180 are respectively formed at the four corners of the vibrator 170. Each of the support areas 180 is an area where the vibration amplitude A is almost zero. The support areas 180 are pressed in the Z-direction such that the dust prevention filter 119 is supported through the receiving members 153 made of, e.g., rubber and having a vibration attenuating property. Consequently, it is possible to reliably press the dust prevention filter 119 so as not to attenuate its vibration so much. Further, the receiving members 153 made of, e.g., rubber allow the dust prevention filter 119 to vibrate in the planar direction, so that the planar direction vibration is also hardly attenuated. Even when an external force of about 100 G is applied, the dust prevention filter 119 is surely received.

According to the arrangement of the receiving members 153 shown in this embodiment, it is easy to form a structure for receiving an external force of several tens of N. At this time, the piezoelectric device 120 comes into contact with the receiving members 153. However, the piezoelectric device 120 is formed of an elastic resin sheet, and so it provides higher strength as compared to a case where the dust prevention filter 119 made of, e.g., glass comes into direct contact. In this case, the dust prevention filter 119 can be made thinner.

The seal 156 for receiving the dust prevention filter 119 needs to be disposed also in an area where the vibration amplitude A is present. However, in the case of the vibration mode according to this embodiment, the vibration amplitude A is smaller at the ridges of the vibration amplitude A on the peripheral side, and so vibration attenuation by the seal 156 can be set very low. This is so, because the dust prevention filter 119 is received at the peripheral portion by the lip shape, and so it does not receive a strong force in the bending vibration amplitude direction, in addition to the fact that the vibration amplitude is basically small.

In this embodiment, seal contact portions 181 are set in contact mainly with node areas 173 where the vibration amplitude A is small, as shown in FIGS. 7 and 9, and so vibration attenuation is further reduced. The lip shape of the seal 156 has a spring property in the Z-direction, but its spring constant can be set smaller so that the fluctuation in the pressing force relative to the Z-direction displacement is minimized to ensure a stable pressing force. Since the gas between the dust prevention filter 119 and the support portions 151c is small, when an external force is applied, the seal 156 is displaced in the Z-direction by use of the spring property of the lip portion to maintain a hermetically sealed state of the space between the dust prevention filter 119 and the optical LPF 118.

The predetermined frequency described above to vibrate the piezoelectric device 120 is determined in accordance with the shape, dimensions, material, and support state of the dust prevention filter 119 for constituting the vibrator 170. In general, temperature influences the elastic modulus of the vibrator 170 and serves as one of the factors that change the natural vibration frequency of the vibrator 170. Accordingly, during operation, it is preferably to measure the temperature of the vibrator 170 to consider a change in the natural vibration frequency of the vibrator 170. In this case, a temperature measurement circuit and a temperature sensor connected to this temperature measurement circuit are provided inside the digital camera 10. Consequently, a correction value for the vibration frequency of the vibrator 170 is predetermined with reference to measurement temperature obtained by the temperature sensor and is stored in the nonvolatile memory 128. The Bucom 101 reads the measurement temperature and the correction value stored in the nonvolatile memory 128. The Bucom 101 calculates a drive frequency for the vibrator 170 and set it as a drive frequency in the dust prevention filter control circuit 121. Consequently, a vibration is generated efficiently even with a temperature change.

Next, an explanation will be given of the dust prevention filter control circuit 121 of the digital camera 10 according to this embodiment.

Figure 16:
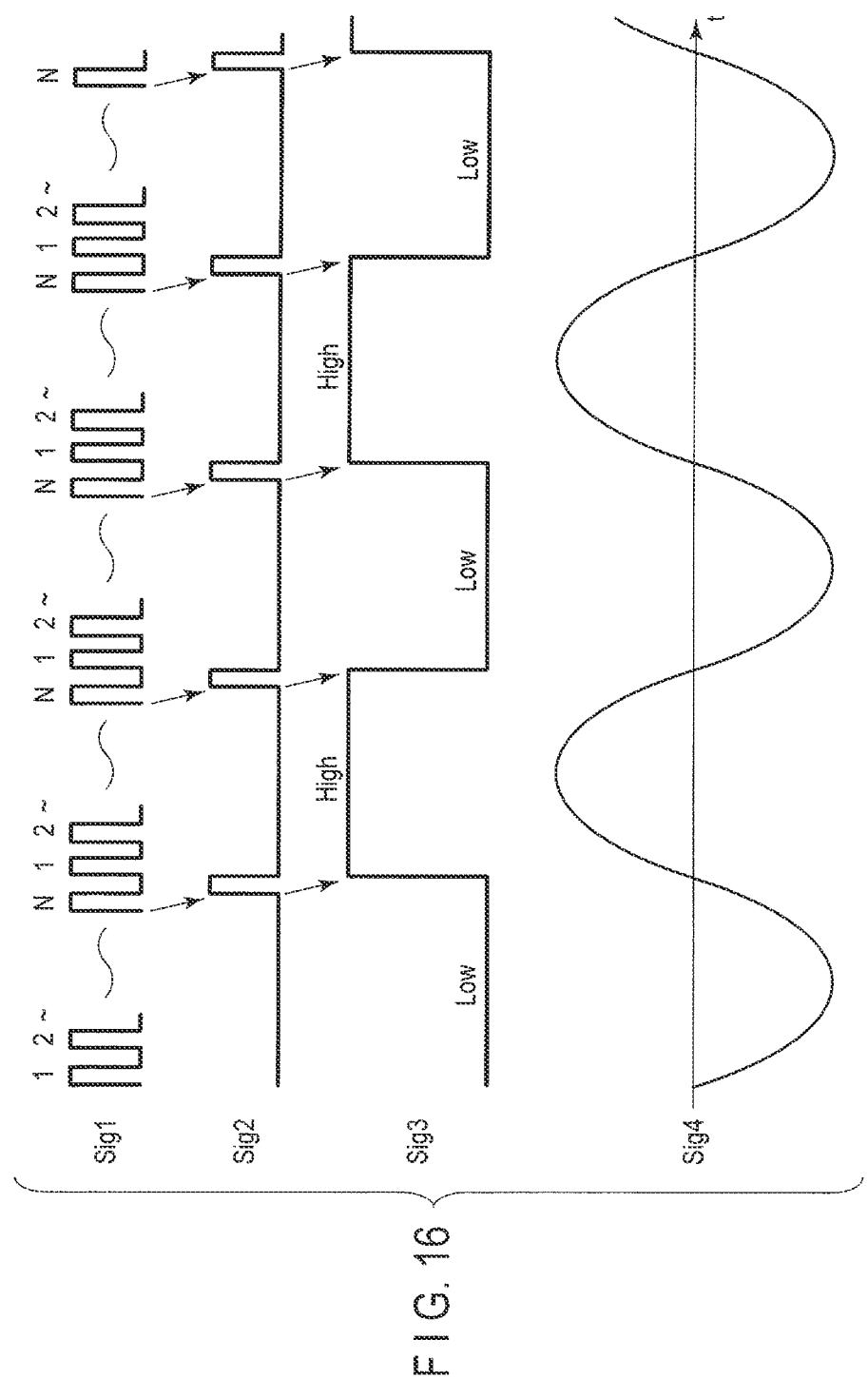
FIG. 16 is a time chart showing respective signal waveforms output from the dust prevention filter control circuit.

FIG. 15 is a schematic circuit diagram showing the dust prevention filter control circuit 121 in the body unit 100 of the digital camera 10. FIG. 16 is a time chart showing respective signal forms output from components of the dust prevention filter control circuit 121 shown in FIG. 15.

The dust prevention filter control circuit 121 exemplified here has a circuit structure shown in FIG. 15, which is configured to generate signals Sig1 to Sig4 having waveforms shown in the time chart of FIG. 16 from respective portions in this circuit, and to perform the following control based on these signals Sig1 to Sig4.

As exemplified in FIG. 15, the dust prevention filter control circuit 121 includes an N-numbering system counter 182, a ½-dividing circuit 183, a plurality of MOS transistors Q00 to Q02, a transformer 185, and a resistor R00.

The MOS transistor Q01 and the MOS transistor Q02 are connected to the primary side of the transformer 185. The piezoelectric device 120 is connected to the secondary side of the transformer 185.

The Bucom 101 includes two IO ports provided thereon as control ports, i.e., an IO port P_PwCont and an IO port D_NCnt, and a clock generator 186 provided inside. The clock generator 186 is connected through the N-numbering system counter 182 and the ½-dividing circuit 183 to the MOS transistor Q01, and the ½-dividing circuit 183 is connected through an inverter 187 to the MOS transistor Q02. A terminal VCnt of the Bucom 101 is connected through a voltage control circuit 188 to the power supply circuit 135. The resistor R00 is connected to prevent an excessive current from flowing through the transformer 185.

If the MOS transistor Q01 and the MOS transistor Q02 are operated by ON/OFF switching, a signal (Sig4) with a predetermined cycle is generated on the secondary side of the transformer 185. The piezoelectric device 120 is driven in accordance with the predetermined cyclic signal generated on the secondary side of the transformer 185 to generate a resonance standing wave in the vibrator 170 to which the dust prevention filter 119 is fixed.

The Bucom 101 controls the dust prevention filter control circuit 121 by use of the two IO ports P_PwCont and D_NCnt and the clock generator 186, as follows. As shown in FIG. 16, the clock generator 186 outputs a pulse signal (basic clock signal) Sig1 with a frequency sufficiently higher than the signal frequency supplied to the piezoelectric device 120. The pulse signal Sig1 is sent to the N-numbering system counter 182.

The N-numbering system counter 182 receives an input of the pulse signal Sig1, counts this pulse signal Sig1, and outputs a count end pulse signal Sig2 every time the counting reaches a predetermined value "N". Accordingly, the N-numbering system counter 182 divides the basic clock signal by 1/N. The count end pulse signal Sig2 thus divided does not render the duty ratio between High and Low at 1:1. The ½-dividing circuit 183 converts the count end pulse signal Sig2 into a pulse signal Sig3 having a duty ratio of 1:1. The pulse signal Sig3 is directly sent to the MOS transistor Q01 and also sent through the inverter 187 to the MOS transistor Q02.

If the pulse signal Sig3 is at a High state, the MOS transistor Q01 is turned on. When the MOS transistor Q01 is turned on, a signal Sig4 boosted in accordance with the boosting ratio of the transformer 185 is generated on the secondary side of the transformer 185. The signal Sig4 is a sine wave with a cycle that varies between positive and negative in synchronism with changes of the pulse signal Sig3 between High and Low.

The turn ratio of the transformer 185 is determined with reference to the output voltage of the unit of the power supply circuit 135 and the voltage necessary for driving the piezoelectric device 120. If the first piezoelectric sheets 301 and the second piezoelectric sheets 302 are thin, the displacement amount of each of the piezoelectric sheets 301 and 302 is proportional to the electric field intensity, and so the transformer 185 may be unnecessary in some cases.

If the piezoelectric device 120 is driven, the MOS transistor Q00 needs to be in an ON-state, and the transformer 185 is thereby supplied with a voltage from the power supply circuit 135. In this case, the ON/OFF control of the MOS transistor Q00 is performed by the Bucom 101 through the IO port P_PwCont.

The set value "N" of the N-numbering system counter 182 is set by the Bucom 101 through the IO port D_NCnt. The Bucom 101 can appropriately control the set value "N" to optionally change the drive frequency for the piezoelectric device 120.

At this time, the frequency can be calculated by the following formula (15).

$$fdrv=fpls/2N \qquad (15)$$

In this formula, N is the set value of the N-numbering system counter 182, fpls is the output pulse frequency of the clock generator 186, and fdrv is the signal frequency supplied to the piezoelectric device 120.

An arithmetic operation based on the formula (15) is performed by the CPU (control means) of the Bucom 101.

Figure 17B:
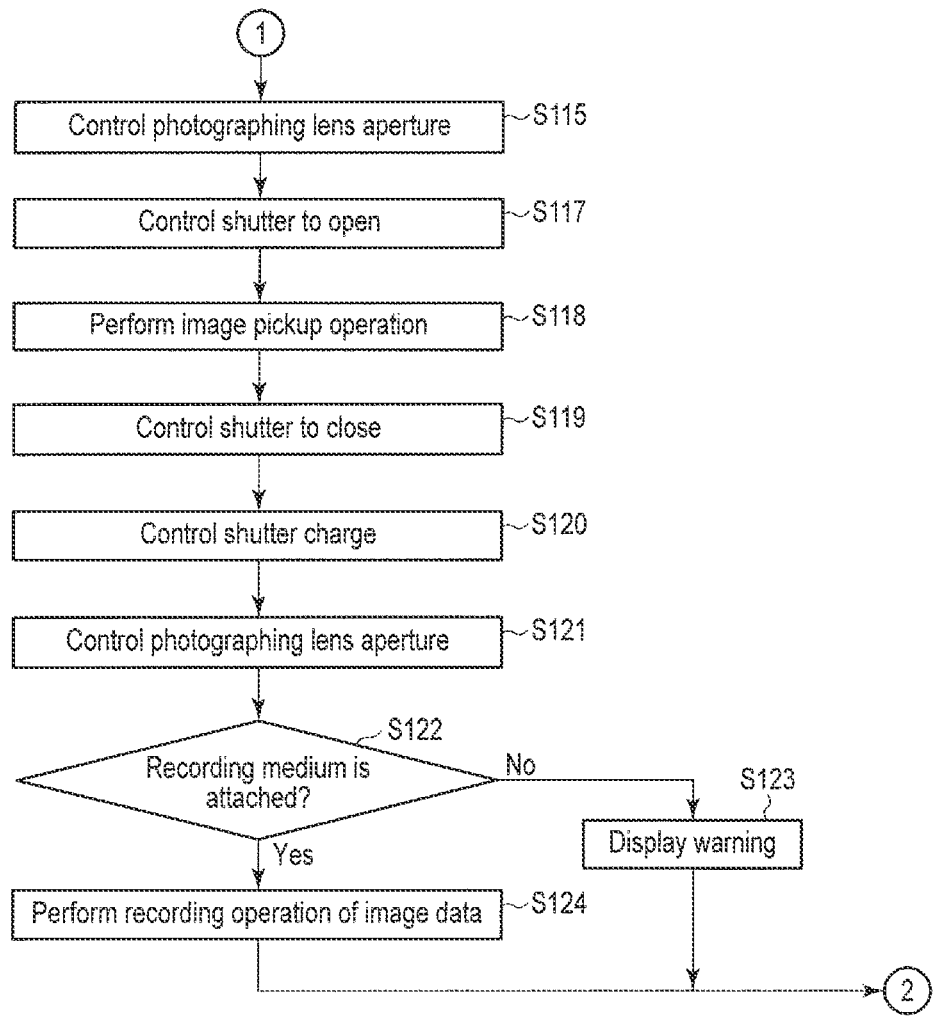
FIG. 17B is a flow chart of main control showing the control operation of a camera sequence (main routine) performed by a Bucom in the digital camera, i.e., the imaging appliance.

Next, an explanation will be given of the control operation of a camera sequence (main routine) performed by the Bucom 101 of the digital camera or imaging appliance designed as described above, with reference to the main control flow chart shown in FIG. 17A,17B.

If the power supply SW (not shown) of the body unit 100 is turned on, the Bucom 101 starts running the camera sequence by executing the main control program.

The Bucom 101 conducts a process for activating this digital camera 10 (step S101). Specifically, the Bucom 101 controls the power supply circuit 135 to supply electric powers respectively to circuit units included in the digital camera 10. The Bucom 101 performs the initial settings of the respective circuits.

The Bucom 101 calls a sub-routine for the vibration application operation to vibrate the dust prevention filter 119 (step S102).

The Bucom 101 periodically conducts processes necessary in the step group of steps S103 to S124. Specifically, at first, the Bucom 101 detects attachment/detachment of an accessory relative to the digital camera 10 (step S103). As an example of the detection of attachment/detachment of an accessory, it is detected whether the lens unit 200, which is one of the accessories, is attached to the body unit 100 (step S104). In this attachment/detachment detection operation, the attachment/detachment state of the lens unit 200 is checked by performing communication between the Lucom 201 and the lens unit 200.

As a result of this detection, if it is detected that a predetermined accessory is attached to the body unit 100, the Bucom 101 calls the sub-routine for the vibration application operation to vibrate the dust prevention filter 119 (step S105).

During a period when an accessory, particularly the lens unit 200, is not attached to the camera main body or body unit 100, there is a high possibility that dust is deposited on the lens, dust prevention filter 119, and so forth. Accordingly, it is effective to perform a dust shake-off operation at the timing when it is detected that the lens unit 200 is attached. Further, when lenses are interchanged, there is a high possibility that ambient air is circulated and dust is carried in and deposited on the inside of the body unit 100. Accordingly, it is worthwhile to perform a dust removal operation when lenses are interchanged. The Bucom 101 considers this as a time immediately before photographing, and it moves to step S106.

In the above-mentioned step S104, if the Bucom 101 detects that the lens unit 200 is not attached to the body unit 100, it moves to the step S106. In the step S106, the Bucom 101 detects the state of a predetermined operation switch in the digital camera 10.

After the step 106, in general, the Bucom 101 causes the liquid crystal monitor 123 to display pickup images and thereby to perform so-called through-image display that serves as a finder. The flow chart of the through-image display is not shown. At this time, the shutter 108 is in a fully open state to pick up images as a matter of course, and an exposure control described later is performed based on these pickup images.

In the through-image display state, the Bucom 101 makes a judgment of whether a 1st release SW, which serves as a release SW, is operated (step S107), wherein this judgment is made based on the ON/OFF state of this release SW.

The Bucom 101 reads the ON/OFF state of the release SW, and, if the 1st release SW is not turned on for a predetermined time or more, it checks the state of a power supply SW (step S108). As a result of this check, if the power supply SW is in an ON-state, the Bucom 101 returns to the above-mentioned step S103, and, if the release SW is in an OFF-state, it moves to an end process (sleep or the like).

On the other hand, in the step S107 described above, if it is judged that the 1st release SW is in an ON-state, the Bucom 101 acquires the luminance information of the photographic subject based on the pickup images obtained by the image processing controller 126, and calculates an exposure time (value Tv) for the image pickup unit 116 and an aperture diaphragm set value (value Av) for the lens unit 200 based on this luminance information, so that it performs exposure control to provide an appropriate exposure quantity (step S109).

Then, the Bucom 101 further detects the contrast of the pickup images (step S110). The Bucom 101 makes a judgment of whether the contrast thus detected is within a permitted range (step S111). If the contrast is not within the permitted range, the Bucom 101 performs drive control of the photographing lens 202 (step S112), and returns to the above-mentioned step S103.

On the other hand, if the contrast is within the permitted range, the Bucom 101 calls the sub-routine for the vibration application operation to start vibrating the dust prevention filter 119 (step S113).

The Bucom 101 makes a judgment of whether a 2nd release SW, which serves as a release SW, is in an ON-state (step S114). If the 2nd release SW is in an ON-state, the Bucom 101 moves to next step S115, and starts a predetermined photographing operation (which will be described later in detail). If the 2nd release SW is in an OFF-state, the Bucom 101 moves to the above-mentioned step S108.

During the image pickup operation, the Bucom 101 controls an electronic image pickup operation for a time period corresponding to a preset time for exposure (exposure time) in the usual manner.

In the photographing operation described above, the Bucom 101 conducts image pickup of the photographic subject in a predetermined order from step S115 to step S121.

The Bucom 101 transmits the value Av to the Lucom 201 to instruct drive of the aperture diaphragm 203 (step S115). The Bucom 101 sets the shutter 108 in a state with the front curtain cross (CLOSE), and then performs an OPEN control of the shutter 108 by starting the front curtain traveling (step S117), and instructs the image processing controller 126 to perform the image pickup operation (step S118). If the exposure of the CCD 117 (image pickup) for a time indicated by the value Tv is finished, the Bucom 101 performs a CLOSE control of the shutter 108 by starting the rear curtain traveling (step S119). If the exposure is finished, the Bucom 101 performs a charge operation of the shutter 108 (step S120). In a state where the shutter 108 is charged, the shutter 108 is set in a fully open state.

Then, Bucom 101 instructs the Lucom 201 to control the aperture diaphragm 203 at a certain position that provides appropriate exposure for the through-image display (step S121), and finishes the sequence of the image pickup operation.

The Bucom 101 detects whether the recording medium 127 is attached to the body unit 100 (step S122). If the recording medium 127 is not attached to the body unit 100, the Bucom 101 provides warning display (step S123). Again, the Bucom 101 moves to the above-mentioned step S103, and repeats the same series of processes.

If the recording medium 127 is attached, the Bucom 101 instructs the image processing controller 126 to record the photographed image data in the recording medium 127 (step S124). If the recording operation of the image data is finished, the Bucom 101 again moves to the above-mentioned step S103, and repeats the same series of processes. The above described explanation is drawn to a still picture photographing operation. Since a moving picture photographing operation is performed in the same way, it will not be explained hereinafter.

Next, in relation to the details of generation of a vibration form, an explanation will be given of the control sequence of the sub-routine for the vibration application operation, which is called in the three steps (S102, S105, and S113) described above, with reference to the flow chart of FIG. 18 showing the sequence of the vibration application operation. The vibration form means the form of the vibration generated by the piezoelectric device 120 serving as a vibration application member.

Figure 18:
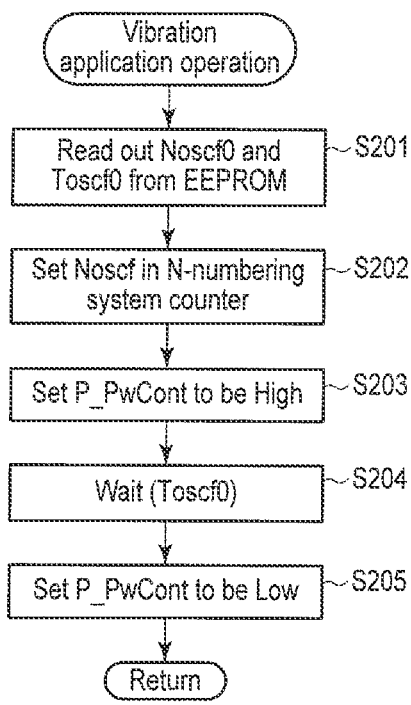
FIG. 18 is a flow chart showing a sub-routine control sequence of a vibration application operation performed by the Bucom in the digital camera, i.e., the imaging appliance.

The sub-routine of the vibration application operation shown in FIG. 18 is a routine conceived to perform a vibration application operation only for removing dust from the dust prevention filter 119. The vibration frequency f0 is set at a predetermined frequency close to the resonance frequency of the dust prevention filter 119.

Figure 19:
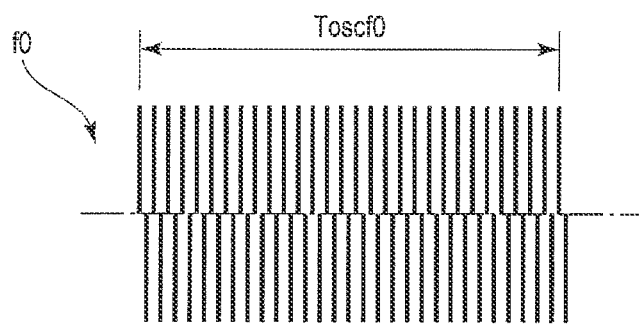
FIG. 19 is a view showing the waveform of a standing nave of a resonance frequency continuously supplied to a vibration application member in the vibration application operation.

FIG. 19 is a view showing the waveform of a resonance frequency continuously supplied to the piezoelectric device 120 serving as a vibration application member in the vibration application operation.

The Bucom 101 reads out data concerning a drive time (Toscf0) and a drive frequency (resonance frequency: Noscf0) for vibrating the dust prevention filter 119 from the data stored in a predetermined area of the nonvolatile memory 128 (step S201).

The Bucom 101 outputs the drive frequency Noscf0 through the IO port D_NCnt to the N-numbering system counter 182 of the dust prevention filter control circuit 121 (step S202).

In step S203 to S205, the Bucom 101 performs a dust removal operation as follows. The Bucom 101 sets a control flag P_PwCont to be High for dust removal (step S203). Consequently, the piezoelectric device 120 applies a vibration to the dust prevention filter 119 at a predetermined drive frequency (Noscf0). When the vibration is applied to the dust prevention filter 119, dust Da deposited on the surface of the dust prevention filter 119 is shaken off.

Specifically, as shown in FIG. 16, the clock generator 186 of the Bucom 101 outputs a pulse signal Sig1 to the N-numbering system counter 182, wherein the pulse signal Sig1 has a frequency sufficiently higher than the signal frequency supplied to the piezoelectric device 120.

The N-numbering system counter 182 counts the pulse signal Sig1, and outputs a count end pulse signal Sig2 every time the counting reaches a predetermined value "N".

The ½-dividing circuit 183 converts the count end pulse signal Sig2 into a pulse signal Sig3 having a duty ratio of 1:1. The pulse signal Sig3 is sent to the MOS transistor Q01 and also sent through the inverter 187 to the MOS transistor Q02.

If the pulse signal Sig3 is at a High state, the MOS transistor Q01 is turned on. If the MOS transistor Q01 is turned on, a signal Sig4 boosted in accordance with the boosting ratio of the transformer 185 is generated on the secondary side of the transformer 185. The signal Sig4 is a sine wave with a cycle that varies between positive and negative in synchronism with changes of the pulse signal Sig3 between High and Low.

The piezoelectric device 120 is driven based on the signal Sig4 with a predetermined cycle generated in the secondary side of the transformer 185, and generates a resonance standing wave in the vibrator 170 to which the dust prevention filter 119 is fixed. Consequently, the dust prevention filter 119 comes into a state where it is being vibrated.

The Bucom 101 waits (step S204) while it vibrates the dust prevention filter 119 for a predetermined drive time (Toscf0), and then sets the control flag P_PwCont to be Low, after a lapse of the predetermined drive time (Toscf0), to stop the dust removal operation (step S205). The Bucom 101 returns to a step next to the called step.

FIG. 19 shows the waveform of the vibration frequency f0 (resonance frequency (Noscf0)) and the drive time (Toscf0) applied to the sub-routine. This waveform is continuous such that the constant vibration (f0=78 kHz) continues for the time (Toscf0) sufficient to remove dust. In other words, in the vibration control, the drive frequency f0 supplied to the piezoelectric device 120 serving as a vibration application member is adjusted to generate this vibration form.

The imaging appliance according to this embodiment described above comprises the plate-shaped dust prevention filter 119 serving as a dust prevention member and including the effective light beam transmissive region Wa formed therein and having a predetermined area spread from the central portion in the radial directions; the holder 145 serving as a securing member and disposed to have a predetermined gap between itself and the dust prevention filter 119; the piezoelectric device 120 serving as a vibration application member for vibrating the dust prevention filter 119, fixed to the peripheral portion of the dust prevention filter 119, and including the flexible thin plate-shaped piezoelectric member 120a; the support members 154 disposed between the holder 145 and the dust prevention filter 119 or the piezoelectric device 120 to surround the center of the dust prevention filter 119; and the two signal electrodes 171 and 172 each formed of a conductive thin plate or film, disposed to partly or entirely holding the piezoelectric member 120a, and partly extending outward relative to the dust prevention filter 119.

According to this embodiment, the vibration application member can be made thinner, and the dust prevention member can be also made thinner because the flexibility of the vibration application member compensates the dust prevention member for its weakness to impulses. If the dust prevention member is made thinner, it can perform a bending vibration more easily to enlarge the vibration amplitude A and thereby to improve the dust removal performance.

Since the electrode holding sheets for supplying a voltage to the piezoelectric member serving as a vibration application member are layered, lead-out terminals for supplying the voltage to the piezoelectric member can be formed integrally with them very easily. Consequently, it is possible to provide a compact and simple structure that includes the two signal electrodes 171 and 172 extending therefrom and serving as lead-out terminals.

The vibration application member including the electrodes are elastic and flexible, and holes and/or cutouts are formed in extending portions of the vibration application member, which extend relative to the dust prevention member, such that the holes and/or cutouts engage with engaging portions of the securing frame. Consequently, it is possible to easily perform positioning of the dust prevention member with high accuracy, and to make the vibration apparatus compact and light as a whole, in synergy with a small space necessary for the vibration application member.

The mass of the dust prevention member and the vibration application member can be smaller by making the dust prevention member and the vibration application member thinner, so that, when an external force is applied due to the acceleration of a vibration or the like, the external force becomes smaller, while the fragile shake proof member is protected by the elastic vibration application member. Consequently, it is possible to fabricate a vibration apparatus for forming a compact dust removing mechanism that is high in dust removal performance and strong against external forces, and further to provide an imaging appliance, such as a digital camera, equipped with this vibration apparatus.

The signal electrodes 171 and 172 are present on a long side of the rectangular shape of the piezoelectric member 120a, and so they can also serve to increase the mechanical strength of the sheet-shaped piezoelectric member 120a.

[First Modification]

Next, an explanation will be given of a first modification of the present invention.

FIG. 20 is a control flow chart for the vibration apparatus according this modification of the present invention. This control flow chart shows an operation sequence different from the sub-routine of the vibration application operation called in the camera sequence (main routine) executed by the Bucom 101 of the digital camera. This control flow chart is made by modifying the sub-routine of the vibration application operation shown in FIG. 18 according to the first embodiment, and it has differences in the operation of the dust prevention filter 119 as compared to the first embodiment.

In the first embodiment, the drive frequency for the dust prevention filter 119 is set at a fixed value f0 to generate a standing wave. In this first modification, a drive frequency Noscf0 is sequentially changed for supply to generate a vibration including a resonance frequency and having a large vibration amplitude A, without strictly controlling the drive frequency Noscf0.

If the dust prevention filter 119 has an aspect ratio of about 0.9, the vibration mode significantly changes (the vibration velocity ratio marks a sharp decline) if the aspect ratio varies due to production variations. Accordingly, it is necessary to exactly set the resonance frequency for every product to drive the piezoelectric device 120. If a frequency other than the resonance frequency is used for this drive, the vibration velocity is further lowered.

If a frequency control method according to this first modification is applied, this drive can be performed with the resonance frequency by use of a very simple control circuit, so that the drive can be appropriately controlled even if the resonance frequency varies due to production variations.

Next, an explanation will be given of a frequency control method according to this first modification with reference to FIG. 20.

The Bucom 101 reads out data concerning a drive time (Toscf0), a drive start frequency (Noscfs), a frequency shift amount (Δf), and a drive end frequency (Noscfe) for vibrating the dust prevention filter 119 from the data stored in a predetermined area of the nonvolatile memory 128 (step S211).

The Bucom 101 sets the drive start frequency (Noscfs) in the drive frequency (Noscf) (step S212). The Bucom 101 outputs the drive frequency (Noscf) through the IO port D_NCnt to the N-numbering system counter 182 of the dust prevention filter control circuit 121 (step S213).

In step S213 and thereafter, the Bucom 101 performs a dust removal operation as follows. Bucom 101 starts and performs the dust removal operation.

The Bucom 101 sets a control flag P_PwCont to be High for dust removal (step S214). Upon this setting of High, the piezoelectric device 120 applies a vibration to the dust prevention filter 119 at a predetermined drive frequency (Noscf), as described previously, to generate a standing wave vibration with a small vibration amplitude A in the dust prevention filter 119. If the vibration amplitude A is small, dust Da deposited on the surface of the dust prevention filter 119 is not removed. The Bucom 101 continues this vibration for the drive time (Toscf0) (step S215).

The Bucom 101 makes a judgment of whether the drive frequency (Noscf) is at the drive end frequency (Noscfe) by comparison (step S216). As a result of this judgment, if they do not agree to each other (judgment NO), the Bucom 101 adds the frequency shift amount (Δf) to the drive frequency (Noscf) and sets this value in the drive frequency (Noscf) again (step S217). The Bucom 101 repeats the operations from the above-mentioned steps S212 to S215.

As a result of the judgment in the above-mentioned step S216, if the drive frequency (Noscf) agrees to the drive end frequency (Noscfe), i.e., (YES), the Bucom 101 sets the P_PwCont to be Low (step S218) to finish the vibration application operation of the piezoelectric device 120. Consequently, the sequence of the vibration application operation is finished.

If the frequency is changed as described above, the amplitude of the standing wave vibration is increased. If the drive start frequency (Noscfs), the frequency shift amount (Δf), and the drive end frequency (Noscfe) are set to pass through the resonance frequency of the standing wave, it is possible to perform control such that a standing wave vibration with a small vibration amplitude A is first generated in the dust prevention filter 119, then the standing wave vibration amplitude is gradually increased, and, after the resonance vibration is obtained, the standing wave vibration amplitude A becomes smaller. If the vibration amplitude A (vibration velocity) is at a predetermined or higher level, dust Da is removed. Consequently, the dust Da is removed over a certain frequency range, and this frequency range is of course wide because the vibration amplitude A at the resonance is large.

If the difference between the drive start frequency (Noscfs) and the drive end frequency (Noscfe) is set large to a certain extent, it is possible to absorb changes in the resonance frequency due to the temperature of the vibrator 170 and to production variations. Further, it is possible to reliably shake off dust Da deposited on the dust prevention filter 119 by use of a very simple circuit structure. If there are a plurality of vibration mode with resonance frequencies close to each other, a drive frequency range can be set to include these vibration modes to shorten the control time and simplify the control.

[Second Modification]

Next, an explanation will be given of a second modification of the present invention.

FIGS. 21 and 22 are diagrams showing a main part of a vibration apparatus according to this modification, wherein FIG. 21 shows a front view of this main part of the vibration apparatus, and FIG. 22 shows a right side view of the structure shown in FIG. 22.

The second modification is different from the first embodiment in the pressing mechanism for the dust prevention filter 119 and in the positioning mechanism for the piezoelectric device 120. Accordingly, these differences will be explained below.

The second modification is mainly different from the first embodiment in the structure for attaching the pressing member 151 to the holder 145. In the first embodiment, a plurality of fixing portions 151d extending on the outer periphery side of the pressing member 151 are fixed to the holder 145 by the screws 150.

In the second modification, the pressing member 151 is structured such that fixing portions 151d extending in the optical axis direction (Z-direction) are provided with a plurality of cutouts 151f formed therein, which engage with protrusions 145a formed on the holder 145 at positions corresponding to the cutouts 151f. This structure includes arm support portions 151a, arms 151b, and support portions 151c, which are essentially the same as those of the first embodiment, and so they will not be explained for this modification.

In a state where the pressing member 151 is attached to the holder 145, the pressing member 151 is held only by receiving, in the Z-direction, a pressing force Fb generated by the arms 151b, and so it can be easily shifted in the Y-direction. Accordingly, after the pressing member 151 is attached, the engaging portions between the cutouts 151f and the protrusions 145a are preferably fixed by bonding. As a matter of course, the fixing portions 151d may be fixed to the holder 145 by screws or the like.

In the first embodiment, the seal 156 has the lip portion, but the seal 156 may be formed to have a U-shape in cross section. If the seal 156 is formed to have a simple shape, the vibrator 170 is held more stably. The vibrator 170 is structured to be sufficiently strong against external forces even without the receiving members 153.

In the second modification, the piezoelectric device 120 includes extending portions 120c provided with a circular hole and an elongated hole formed as cutouts 120f, while the holder 145 is provided with cutouts 120f, and columnar protrusions 145b are disposed at the positions corresponding to the cutouts 120f to engage with them. Since this structure provides positioning of the vibrator 170 in the X-direction and the Y-direction, it is not necessary to use the support members 154 employed in the first embodiment for positioning the dust prevention filter 119 in the X-direction and the Y-direction.

Even if the dust prevention filter 119 is received in this way in the X-direction and the Y-direction, since the extending portions are made of a flexible elastic resin material, the dust prevention filter 119 is prevented from being broken when it receives an external force, while the vibration generated in the dust prevention filter 119 is not hindered.

The present invention has been described with reference to the embodiment, but the present invention is not limited to the embodiment described above, and various modifications and/or applications may be made thereto without departing from the spirit or scope of the present invention, as a matter of course.

For example, the dust removing mechanism including the vibration application member described above may be combined with a system configured to use air flow to remove dust Da deposited on the dust prevention filter 119 or a mechanism configured to use a wiper to remove dust Da deposited on the dust prevention filter 119.

In the embodiment described above, the camera has a finder utilizing a liquid crystal monitor, but it may have an optical finder of the single-lens reflex type, as a matter of course.

In the embodiment described above, the image pickup device is a CCD, but it may be formed of another image pickup device of, e.g., the CMOS type.

The vibration application target is not limited to the exemplified dust prevention filter 119, but may be another light transmissive member present on the optical path (such as a cover glass or half mirror). In this case, such a member receives a vibration to shake off dust Da deposited on its surface. The frequency and the drive time for generating a vibration and the setting position of the vibration application member are set in accordance with such a member.

The present invention can be applied to any imaging appliance that requires a dust removing function, other than the exemplified image pickup apparatus (digital camera). For such an application, modifications are made in practical use, as needed. Specifically, a dust removing mechanism according to the present invention may be applied to an image projection apparatus using a display device, such a liquid crystal, such that the dust removing mechanism is disposed between the display device and a light source, or between the display device and a projection lens.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A vibration apparatus comprising:
    a plate-shaped dust prevention member including a light transmissive region having a predetermined area spread from a central portion in radial directions;
    a securing member disposed to have a predetermined gap between itself and the dust prevention member;
    a vibration application member configured to vibrate the dust prevention member, and including a piezoelectric member and electrodes, each of the electrodes formed of a conductive thin plate or film, disposed in a voltage-supplied region to partly or entirely hold the piezoelectric member, and partly extending outward relative to the dust prevention member; and
    a support member disposed between the securing member and the dust prevention member or the vibration application member to surround a center of the dust prevention member;
    wherein the piezoelectric member is formed of a plate-shaped resin comprised of a poly-L-lactic acid sheet and a poly-D-lactic acid sheet that are alternately layered and stretched in a direction orthogonal with an outer periphery line of the dust prevention member, is attached annularly along the peripheral portion of the dust prevention member and is supplied with voltage in the voltage-supplied region.

2. The vibration apparatus according to claim 1, wherein the vibration application member further includes insulation sheets respectively holding the piezoelectric member and the electrodes, the electrode respectively extends outward relative to the dust prevention member to respectively form extending portions, and the extending portions are respectively held by the insulation sheets.

3. The vibration apparatus according to claim 1, wherein the piezoelectric member is plate-shaped as a whole and includes a light transmissive region other than the annularly attached region.

4. The vibration apparatus according to claim 1, wherein each of the poly-D-lactic acid sheet and the poly-L-lactic acid sheet includes an effective light beam transmissive region almost at a central portion to transmit light beams.

5. The vibration apparatus according to claim 1, wherein each of the electrodes is supported by an insulation support body formed of a flexible thin plate.

6. The vibration apparatus according to claim 1, wherein each of the electrodes includes an extending portion extending outward relative to the dust prevention member, and the extending portion is connected to a dust prevention filter control circuit configured to drive the vibration application member to generate a vibration in the dust prevention member.

7. The vibration apparatus according to claim 1, wherein at least one of a region formed of the plate-shaped resin of the piezoelectric member and the electrodes include an extending portion extending outward relative to the dust prevention member, and the extending portion includes a cutout or hole formed therein to engage with an engaging portion of the securing member so as to position the dust prevention member.

8. The vibration apparatus according to claim 1, wherein a region formed of the plate-shaped resin of the piezoelectric member has a rectangular shape, and the electrodes are disposed on a long side of the rectangular shape of the piezoelectric member.

9. An imaging appliance comprising:

an image surface configured to generate an optical image;

a plate-shaped dust prevention member including a light transmissive region having a predetermined area spread from a central portion in radial directions, and disposed such that the light transmissive region faces the image surface with a predetermined gap therebetween;

a securing member disposed to have a predetermined gap between itself and the dust prevention member;

a vibration application member configured to vibrate the dust prevention member, and including a piezoelectric member and electrodes, each of the electrodes formed of a conductive thin plate or film, disposed in a voltage-supplied region to partly or entirely hold the piezoelectric member, and partly extending outward relative to the dust prevention member;

a facing member disposed to surround a center of the dust prevention member and to face one of the dust prevention member and the vibration application member on a side closer to the image surface;

a support member disposed between the facing member and the one of the dust prevention member and the vibration application member and configured to support the dust prevention member or the vibration application member; and wherein the piezoelectric member consists of a plate-shaped resin comprised of a poly-L-lactic acid sheet and a poly-D-lactic acid sheet that are alternately layered and stretched in a direction orthogonal with an outer periphery line of the dust prevention member, is attached annularly along at least the peripheral portion of the dust prevention member, and is supplied with voltage in the voltage-supplied region.

10. The imaging appliance according to claim 9, wherein the vibration application member further includes insulation sheets respectively holding the piezoelectric member and the electrodes, the electrodes respectively extend outward relative to the dust prevention member to respectively form extending portions, and the extending portions are respectively held by the insulation sheets.

11. The imaging appliance according to claim 9, wherein the piezoelectric member is plate-shaped as a whole and includes a light transmissive region other than the annularly attached region.

12. The imaging appliance according to claim 9, wherein each of the poly-D-lactic acid sheet and the poly-L-lactic acid sheet includes an effective light beam transmissive region almost at a central portion to transmit light beams.

13. The imaging appliance according to claim 9, wherein each of the electrodes is supported by an insulation support body formed of a flexible thin plate.

14. The imaging appliance according to claim 9, wherein each of the electrodes includes an extending portion extending outward relative to the dust prevention member, and the extending portion is connected to a dust prevention filter control circuit configured to drive the vibration application member to generate a vibration in the dust prevention member.

15. The imaging appliance according to claim 9, wherein at least one of a region formed of the plate-shaped resin of the piezoelectric member and the electrodes include an extending portion formed therein and extending outward relative to the dust prevention member, and the extending portion includes a cutout or hole formed therein to engage with an engaging portion of the securing member so as to position the dust prevention member.

16. The imaging appliance according to claim 9, wherein a region formed of the plate-shaped resin of the piezoelectric member has a rectangular shape, and the electrodes are disposed on a long side of the rectangular shape of the piezoelectric member.

17. A vibration apparatus comprising:

a plate-shaped dust prevention member including a light transmissive region having a predetermined area spread from a central portion in radial directions;

a securing member disposed to have a predetermined gap between itself and the dust prevention member;

a vibration application member fixed to a peripheral portion of the dust prevention member, including a flexible thin plate-shaped piezoelectric member, and configured to vibrate the dust prevention member;

a support member disposed between the securing member and the dust prevention member or the vibration application member to surround a center of the dust prevention member;

an electrode formed of a conductive thin plate or film, disposed to partly or entirely holding the piezoelectric member, and partly extending outward relative to the dust prevention member;

poly-L-lactic acid sheet or poly-D-lactic acid sheet stretched in a direction orthogonal with an outer periphery line of the dust prevention member, and wherein the electrode is disposed along the outer periphery line of the dust prevention member, the piezoelectric member includes layers of at least one of the poly-L-lactic acid sheet or the poly-D-lactic acid sheet, and the poly-D-lactic acid sheet and the poly-L-lactic acid sheet are alternately layered to form the piezoelectric member.

* * * * *